United States Patent
Suzuki et al.

(10) Patent No.: US 7,113,299 B2
(45) Date of Patent: Sep. 26, 2006

(54) PRINTING WITH CREDIT CARD AS IDENTIFICATION

(75) Inventors: Stephanie Ann Suzuki, Irvine, CA (US); Rajini Bala Giridharagopal, Ladera Ranch, CA (US); Neil Y. Iwamoto, Mission Viejo, CA (US); Vladimir Sevastyanov, Irvine, CA (US); Royce E. Slick, Mission Viejo, CA (US); Martin Ervin Page, Tustin, CA (US); Katayoun Shoa, Redondo Beach, CA (US); Yokichi Joe Tanaka, Foothill Ranch, CA (US); Paul Chen, Huntington Beach, CA (US); Stephen Keung, Irvine, CA (US)

(73) Assignee: Canon Development Americas, Inc., Irvine, CA (US)

( * ) Notice: Subject to any disclaimer, the term of this patent is extended or adjusted under 35 U.S.C. 154(b) by 786 days.

(21) Appl. No.: 09/903,940

(22) Filed: Jul. 12, 2001

(65) Prior Publication Data

US 2003/0011809 A1    Jan. 16, 2003

(51) Int. Cl.
    *B41J 1/00* (2006.01)
(52) U.S. Cl. .................. 358/1.15; 358/1.14; 358/1.18; 380/243; 705/39; 707/100
(58) Field of Classification Search ............... 358/1.15, 358/453, 1.14, 1.18; 455/409; 713/170; 235/381; 705/27, 39; 347/188; 707/100; 380/243
See application file for complete search history.

(56) References Cited

U.S. PATENT DOCUMENTS

| | | |
|---|---|---|
| 4,359,631 A * | 11/1982 | Lockwood et al. ......... 235/381 |
| 4,386,266 A | 5/1983 | Chesarek .................... 235/380 |
| 4,899,373 A | 2/1990 | Lee et al. ................... 379/207 |
| 5,392,351 A | 2/1995 | Hasebe et al. ................. 380/4 |
| 5,485,510 A | 1/1996 | Colbert ....................... 379/145 |

(Continued)

FOREIGN PATENT DOCUMENTS

EP    1091275    11/2001

(Continued)

OTHER PUBLICATIONS

Dannenberg, Roger B., et al., "A Butler Process for Resource Sharing on Spice Machines", ACM Transactions on Office Information Systems, vol. 3, No. 3, pp. 234-252, Jul. 1985.

(Continued)

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

Printing over a network by inputting print data to be printed and associated credit card information at a host terminal, uploading a print job comprising the print data to be printed and the associated credit card information to a print data storage server, inputting credit card information at an input device that communicates with the print data storage server, transmitting print data stored in the print data storage server having associated credit card information that corresponds to the credit card information input at the input device, and printing the print data on a printing device. The uploaded print job may be marked as ready for printing such that the print data transmitted to the printing device is that which has been marked as ready for printing. In addition, a display of pending print jobs may be provided for a user to select a print job to print prior to the print data being transmitted to the input device.

48 Claims, 23 Drawing Sheets

U.S. PATENT DOCUMENTS

| | | |
|---|---|---|
| 5,600,762 A | 2/1997 | Salgado et al. ............. 395/114 |
| 5,606,613 A | 2/1997 | Lee et al. .................... 380/21 |
| 5,633,932 A | 5/1997 | Davis et al. ................. 380/25 |
| 5,666,215 A | 9/1997 | Fredlund et al. ............ 358/487 |
| 5,720,012 A | 2/1998 | McVeigh et al. ........... 395/113 |
| 5,752,697 A | 5/1998 | Mandel et al. .............. 271/288 |
| 5,826,245 A | 10/1998 | Sandberg-Diment ......... 705/44 |
| 5,852,744 A | 12/1998 | Agatone et al. ............ 395/837 |
| 5,862,321 A | 1/1999 | Lamming et al. ........ 395/200.3 |
| 5,867,633 A | 2/1999 | Taylor, III et al. .......... 395/109 |
| 5,868,236 A | 2/1999 | Rademacher ............... 194/217 |
| 5,880,712 A | 3/1999 | Goldman .................... 345/168 |
| 5,903,646 A | 5/1999 | Rackman ....................... 380/4 |
| 5,905,248 A | 5/1999 | Russell et al. .............. 235/462 |
| 5,930,465 A | 7/1999 | Bellucco et al. ............ 395/114 |
| 5,933,498 A | 8/1999 | Schneck et al. ............... 380/4 |
| 5,933,501 A | 8/1999 | Leppek ........................ 380/21 |
| 5,949,881 A | 9/1999 | Davis .......................... 380/25 |
| 5,982,996 A | 11/1999 | Snyders ...................... 395/114 |
| 6,023,682 A | 2/2000 | Checchio ...................... 705/18 |
| 6,025,925 A | 2/2000 | Davidson, Jr. et al. .... 358/1.15 |
| 6,052,675 A | 4/2000 | Checchio ...................... 705/44 |
| 6,061,668 A | 5/2000 | Sharrow ...................... 705/400 |
| 6,064,838 A | 5/2000 | Maruta et al. ................. 399/79 |
| 6,067,352 A | 5/2000 | Douhet et al. ........... 379/93.25 |
| 6,076,076 A | 6/2000 | Gottfreid ...................... 705/45 |
| 6,079,018 A * | 6/2000 | Hardy et al. ................. 713/170 |
| 6,151,464 A | 11/2000 | Nakamura et al. ............. 399/79 |
| 6,154,295 A | 11/2000 | Fredlund et al. ............ 358/487 |
| 6,157,824 A * | 12/2000 | Bailey ........................ 455/409 |
| 6,181,436 B1 | 1/2001 | Kurachi ..................... 358/1.15 |
| 6,636,837 B1 * | 10/2003 | Nardozzi et al. .............. 705/27 |
| 6,687,018 B1 * | 2/2004 | Leong et al. .............. 358/1.15 |
| 6,707,570 B1 * | 3/2004 | Gotanda et al. ........... 358/1.15 |
| 6,760,128 B1 * | 7/2004 | Jackson et al. ............. 358/453 |
| 6,806,977 B1 * | 10/2004 | Freeny et al. ............. 358/1.15 |
| 6,842,186 B1 * | 1/2005 | Bouchard et al. ........... 347/188 |
| 6,847,969 B1 * | 1/2005 | Mathai et al. .............. 707/100 |
| 6,952,780 B1 * | 10/2005 | Olsen et al. .................. 726/26 |
| 2002/0138422 A1* | 9/2002 | Natsuno ...................... 705/39 |
| 2005/0015331 A1* | 1/2005 | Kunugi et al. ................ 705/39 |

FOREIGN PATENT DOCUMENTS

| | | |
|---|---|---|
| EP | 1091285 | 11/2001 |
| JP | 2000-310819 | 7/2000 |

OTHER PUBLICATIONS kinkos.com website, visited on Mar. 14, 2001.

* cited by examiner

FIG. 26

Canon DOCgo!

Please enter your credit card information to proceed.

Help

Credit Card information

*Issuer: VISA

*Card number:

*Expiration Month: 1

*Expiration Year: 2001

*Name on card:

● Next>>  ⊗ Cancel

Canon DOCgo!

This page summarizes your request for print. Please record the information for future reference.

Help

542

Print Job Summary

| Documents: | Pages: | Copies: |
|---|---|---|
| APPEALS CHART.ppt | 1 | 1 |

Total Number of Pages Printed: 1
Price/Page: $0.50
Total Cost: $0.50
Credit Card for Print Job Retrieval: VISA, xxxxxxxxxx4750
Confirmation Number:
This confirmation number may be used in the future to reference your print request  1041

● OK
543

PRINTING WITH CREDIT CARD AS IDENTIFICATION

BACKGROUND OF THE INVENTION

1. Field of the Invention

The present invention relates to printing over a network using a credit card as a means of identification. More specifically, the present invention relates to uploading a print job consisting of print data and associated credit card information onto a network server and retrieving the print job from the server at a printer by using a credit card as a means of identifying the person printing the job.

2. Description of the Related Art

Uploading print data over a network such as the Internet to have the print job printed at a remote location has become increasingly popular. For instance, some computer users desire to submit print jobs over the Internet to a print shop to have the print job printed out by the print shop. This may be the case where, for example, a computer user may not have a printer at home or in his office to print his work or, where he may have a printer, but the printer is not capable of producing the type of printout he wants. For instance, a user may have a printer that only prints black and white printouts but the user may want to print a color image, or he may want to print a large volume of printouts but does not want to expend his own printer and paper resources doing so. In either case, one option may be for the user to submit the print job over the Internet to a print shop that has the capability of producing the desired printout.

One example of an Internet print shop is provided by Kinkos®. In a print shop approach such as Kinkos®, a user logs-on to the Kinkos® website and uploads a file so that it can be printed and delivered by a selected Kinkos® store. The user first generates a file to be uploaded using an application program (e.g. a word processing or spreadsheet program) and after having saved the file, the user activates a web browser application on his computer to access the Kinkos® website.

In order to submit a print job for printing over the Internet with the Kinkos® system, the user selects a print option in the Kinkos® website and navigates a series of steps for submitting the print job. These steps include inputting information for uploading, inputting finishing options, specifying the recipients, specifying how the finished product is to be delivered and providing payment information. In the uploading step, the user selects the file or files that are to be uploaded to Kinkos® for printing. Once the user has selected the file or files to be uploaded, the user is prompted to enter various finishing options. Some of the finishing options include a black and white printout, a color printout and various binding options.

After the user enters at least one finishing option, he is prompted to either register with Kinkos® (i.e. create a new account) or input his existing account information such as an email address and a password. In registering to create a new account, the user provides identification information such as an email address, first and last name, a password, and a company name and address. Once the user has registered or entered their existing account information, the user is prompted to enter the recipients of the finished product. The user can select one or more recipients from an address book or he can enter a new recipient.

After having specified the recipients, the user is prompted to specify a delivery option. Various delivery options may be selected such as in store pickup of the hardcopy print job at a specified Kinkos® store, or to have the hardcopy print job delivered to a recipient's home, office or to some other specified location.

After having selected a delivery option, the user is prompted to input payment information such as a credit card number. Once the user has entered the payment information, he confirms his purchase, whereby the designated file to be printed is uploaded to Kinkos®.

Finally, after having uploaded the file and payment information to Kinkos®, the selected Kinkos® store processes the print job to generate the finished hardcopy product. After the hardcopy is printed, it is either held at the Kinkos® store until the recipient arrives to pick it up, or it is delivered to the specified recipient, depending on the delivery option selected.

Thus, in the Kinkos® system a user uploads a file and credit card information for payment to Kinkos® whereby the file is processed by a Kinkos® store to generate a hardcopy printout that is either picked-up by a recipient at the store or delivered to a recipient's home, office or some other location. Accordingly, the Kinkos® system requires that the user wait until Kinkos® can process the print job before it can be retrieved and as such, the user has no control over when or where he can retrieve his print job. That is, the user can not simply retrieve his uploaded print job at a printer any time he wants, but must wait for Kinkos® to process the print job and have the job delivered or go to the store to pick it up.

Additionally, if the user changes his mind after he has uploaded his print job and decides not to have the print job printed out (for example, if the user has made a change to the file that was uploaded), he must contact the Kinkos® store that he has selected to process the job and cancel the print request before the job is processed. Otherwise, the user may be charged for processing the print job.

Further, once the recipient uploads the print job and specifies the delivery options, if he changes his mind and wants the print job delivered to a different location, he must contact the Kinkos® store that he has selected to process the print job and notify them of the change.

As can readily be seen from the foregoing, the Kinkos® system has very little flexability for the user once the print job has been uploaded. That is, once the user uploads the file for printing, the user is not able to simply retrieve the printout at a location convenient to him at a time that is convenient to him.

Another system which provides for a user to submit a print job for printing over a network has been described in co-pending U.S. patent application Ser. No. 09/411,665 entitled "Authenticated Secure Printing", filed on Oct. 4, 1999 (hereinafter referred to as the '665 application). The '665 application describes a system in which print data and recipient identification information (commonly known as a distinguished name contained in a digital certificate) are transmitted from a personal computer to a print node via a secure transmission protocol such as SSL (Secure Sockets Layer) or TLS (Transport Layer Security). As described in the '665 application, the recipient's identification information is obtained either from a smartcard or via a public key infrastructure. Upon receipt of the print data and recipient identification information, the print node performs an encryption algorithm to encrypt both the print data and the identification information and securely stores both without printout until the print node receives authentication from the intended recipient.

In order to retrieve the print data and have it printed at a printer, the person holding the proper recipient authentication information (such as the smartcard as described in the '665 application), presents the authentication information to the printer. Once the smartcard is presented at the printer, the recipient's identification information is used to authenticate the recipient and the stored encrypted print data is decrypted and printed on the printer.

Thus, the system of the '665 application provides a way for the user to upload a print job and recipient identification information using a smartcard and for the recipient holding the proper authentication information to retrieve the print job at a printer using a smartcard. However, smartcards are not generally available to or used by the general population and therefore, the '665 application's system is somewhat limited in its practicality. That is, smartcards are generally available only to employees of companies that may utilize such a system and are not carried by the general public. As a result, the number of users who can take advantage of the '665 application's system is somewhat limited.

Moreover, implementation of a smartcard system such as that described in the '665 application requires that a public key infrastructure be implemented and that a smartcard reader or other means of inputting a digital certificate of the recipient be implemented at each computer for which the print data is to be submitted from. Accordingly, while the system described in the '665 application may be sufficient within a corporation where the number of users is limited to a few hundred or even a few thousand, the cost of such a system may be prohibitively high for worldwide implementation for use by the general public.

SUMMARY OF THE INVENTION

The present invention addresses the foregoing by uploading a print job with associated credit card information via a network such as the Internet and retrieving the print job at a printer utilizing a credit card. Utilizing a web browser, a user accesses a web page of a system operator (such as Canon) where they input print data by, for example, selecting a file stored on a host computer, and also input credit card information. The selected file and the credit card information are uploaded to a print data storage server where they are associated with one another and stored awaiting to be printed. To print the print data, a user enters the same associated credit card information at an input device by, for example, swiping a credit card through a credit card reader. The credit card information is transmitted from the input device to the print data storage server where the server then transmits the print data that has associated credit card information that corresponds to the credit card information received from the input device. Finally, a printer receives the print data and prints out an image based on the received print data.

As a result, a user can upload a print job to a server merely using a web browser and can retrieve the print job at virtually any location that has a printer in which credit card information can be input and transmitted to the server at any time they choose. Additionally, since credit cards are generally available to the public at large as compared to smartcards, more users can utilize the foregoing system at a much lower cost.

Thus, in one aspect the invention performs printing over a network by inputting print data to be printed and associated credit card information at a host terminal, uploading a print job comprising the print data and the associated credit card information from the host terminal to a print data storage server, inputting credit card information at an input device that communicates with the print data storage server, transmitting print data having associated credit card information that corresponds to the credit card information input at the input device from the print data storage server to the input device, and printing the print data on a printing device.

The invention may further provide for marking the uploaded print data as ready for printing. After the print data and associated credit card information are uploaded to the server, and prior to the credit card information being input at the input device, the uploaded information can be marked to identify those print jobs that the user wants to print when the credit card information is presented at the input device. Accordingly, when the credit card information is input at the input device and transmitted to the print data storage server, only those print jobs which have been marked are transmitted to the input device. In this way, the user can upload multiple jobs and print the jobs at different locations and at different times by marking some of the jobs and printing them at one location, and then later marking other jobs and printing them later at a different location.

The invention may also provide for allowing registered users of a printing service to store their print data on the print data storage server for an unspecified amount of time. That is, if the user who uploads the print data registers as a regular user of a printing service operated by an owner of the print data storage server, the owner may allow the registered user to utilize the server as a storage medium for their print data for as long as practicable. However, if the user who uploaded the data is not a registered user, but merely a casual user, the invention may provide for deleting the uploaded print data after a specified time period has elapsed, or after the print job has been printed.

In another aspect, the invention provides a system for printing over a network, comprising a host terminal, a print data storage server, a network interface device, and a printing device. The host terminal comprises an input device that inputs print data to be printed and associated credit card information, and a transmitter that transmits the input print data and the associated credit card information to the print data storage server. The print data storage server comprises a receiver that receives the print data and the associated credit card information transmitted by the host terminal, and that receives credit card information from the network interface device, and a transmitter that transmits to the network interface device, print data having associated credit card information corresponding to the credit card information received by the receiver from the network interface device. The network interface device comprises a first receiver that receives input credit card information, a first transmitter that transmits the input credit card information to the print data storage server, a second receiver that receives the print data from the print data storage server, and a second transmitter that transmits the received print data to the printing device. The printing device comprises a receiver that receives the print data transmitted by the network interface device, and an image outputting device that outputs an image based on the received print data.

In yet another aspect, the invention provides for a printing device comprising a receiver that receives print data transmitted over a network, an image output device that outputs an image based on the print data received by the receiver, an input device that inputs credit card information, and a transmitter that transmits the input credit card information over the network to a print data storage server. The print data storage server stores print data and associated credit card information that is uploaded to the print data storage server, and, when the input credit card information is transmitted to the print data storage server by the transmitter, the print data storage server transmits print data which has associated credit card information that corresponds to the input credit card information to the receiver.

In yet a further aspect, the invention provides for a server apparatus comprising a first receiver that receives print data and associated credit card information from a host terminal, a storage medium that stores the print data and the associated credit card information, a second receiver that receives credit card information from a credit card input device, a processor that determines whether the received credit card information received by the second receiver corresponds to the associated credit card information stored in the storage medium, and a transmitter that transmits print data stored in the storage medium that has associated credit card information corresponding to the credit card information received by the second receiver to the credit card input device.

In yet another aspect, the invention prints a print job by swiping a credit card through a credit card reader at a printing device, and in response to the swiping, the printing device printing a print job which has associated credit card information corresponding to the swiped credit card. Further, in response to the credit card swiping, the printing device transmits the credit card information to a print data storage device which stores print jobs having credit card information associated therewith, and the print data storage server transmits to the printing device a print job having associated credit card information corresponding to the credit card information transmitted by the printing device.

According to this aspect, a print job can be retrieved at a printer merely by walking up to the printer and swiping a credit card through a credit card reader connected to the printer. Thus, a user can have his print job printed at virtually any location and at any time that he chooses.

In yet a further aspect, the invention prints over a network by inputting print data to be printed and associated credit card information at a host terminal, uploading a print job comprising the print data and the associated credit card information from the host terminal to a print data storage server, the print data storage server performing an encryption or hashing process on the associated credit card information and storing a first resultant value with the print data, inputting credit card information at an input device that communicates with the print data storage server, the input device performing an encryption process on the input credit card information to obtain a second resultant value, the input device transmitting the second resultant value to the print data storage server, the print data storage server transmitting print data having a first resultant value that corresponds to the second resultant value to the input device, and printing the print data on a printing device.

In a further aspect, the invention prints over a network by inputting print data to be printed and associated credit card information at a host terminal, uploading a print job comprising the print data and the associated credit card information from the host terminal to a print data storage server, inputting credit card information at an input device that communicates with the print data storage server, transmitting the input credit card information to the print data storage server, the print data storage server transmitting data indicative of at least one pending print job that corresponds to the credit card information, displaying a listing of pending print jobs based on the indicative data, selecting at least one print job from the displayed listing, transmitting data indicative of the at least one selected print job, transmitting print data corresponding to the at least one selected print job to the input device, and printing the print data on a printing device.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 26 depicts a user interface window for a user to enter credit card information.

FIG. 27 depicts a user interface window for a print job summary.

DETAILED DESCRIPTION OF THE PREFERRED EMBODIMENTS

Figure 1:
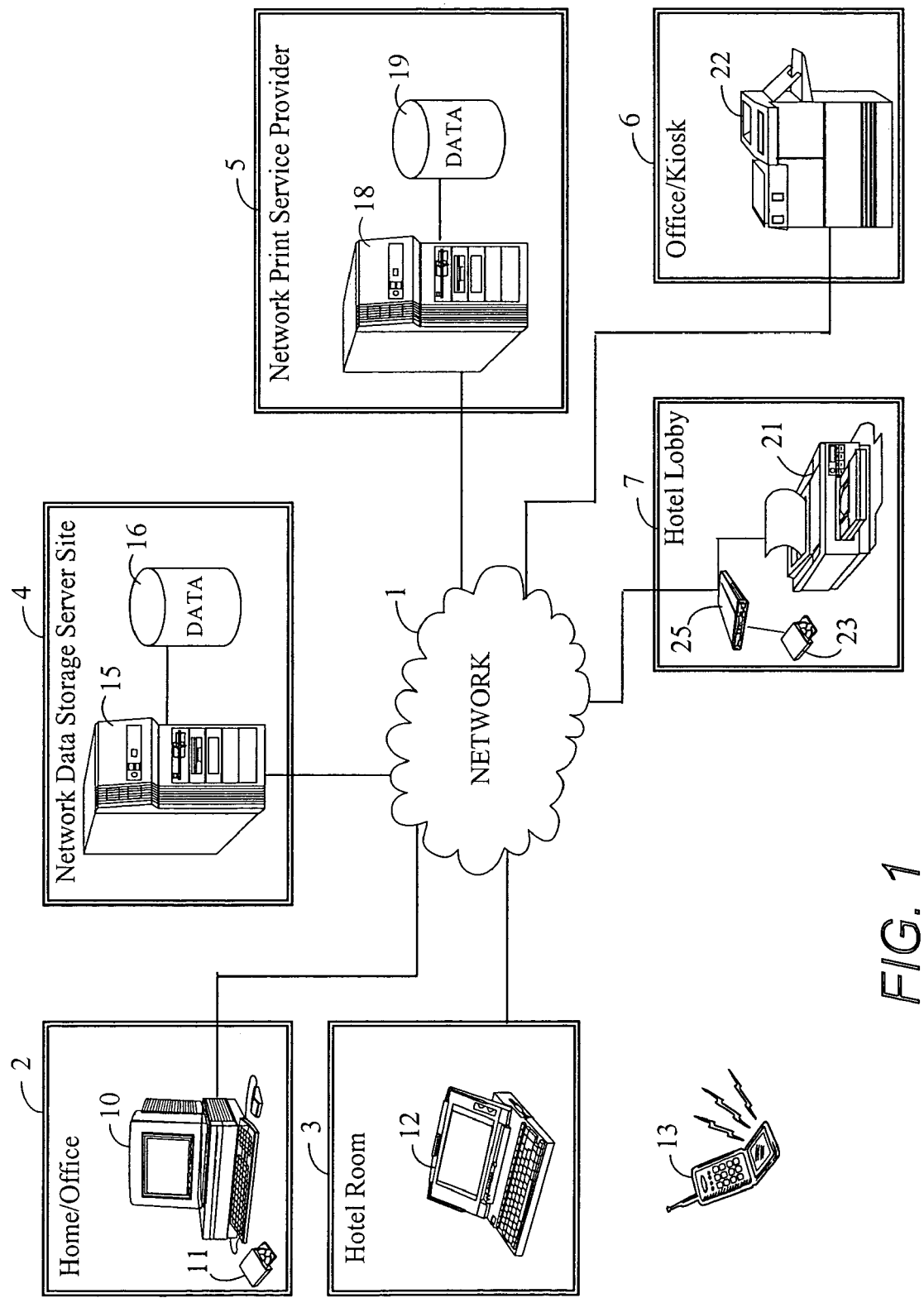
FIG. 1 depicts a network environment in which the invention may be employed.

FIG. 1 depicts one example of a network environment in which the invention may be employed. The network environment depicted in FIG. 1 is preferably the Internet or an Intranet, but is not limited to such and any network environment could be utilized to practice the invention. As seen in FIG. 1, a network infrastructure (such as the Internet or an Intranet) may provide for communication between various entities located at the same or different geographical locations. For instance, a user's home or office 2, a hotel room 3, a network data storage server site 4, a hotel lobby 7, an office or a kiosk 6 and a network print service provider 5 may all be connected to network 1, thereby providing communication between each of the entities regardless of their geographical location. Additionally, a user may be able to connect to network 1 with a wireless palm device, a wireless telephone 13 that provides for Internet access, or some other portable device. Of course, the entities depicted in FIG. 1 are mere examples of a few entities that may be connected to network 1 and numerous other entities could also be included. With the various entities being connected via network 1, information can be transferred from one entity to another via network 1. For instance, information can be transferred from home/office 2 to network print service provider 5 and then to hotel lobby 7 via network 1. Therefore, data such as a print job can be communicated from home/office 2 to network print service provider 5 via network 1 and the print job can be retrieved from network print service provider 5 at hotel lobby 7 via network 1.

It should be noted that, although home/office 2, network data storage server site 4 and office/kiosk 6 are depicted in FIG. 1 as being located at separate geographical locations, it can be readily understood that they may all be part of the same office infrastructure and may be contained within the same office building. That is, they may each be a part of a local area network (LAN) contained within the same office building. Of course, it can also be readily understood that they may be part of a wide area network (WAN) wherein home/office 2, network data storage server site 4 and office/kiosk 6 are all located at different geographical locations. Similarly, although hotel room 3 and hotel lobby 7 are depicted in FIG. 1 as being separate locations, they may, of course, be within the same hotel.

Each of the entities 2 through 7 include various computing equipment which are connected to network 1 to provide the communication functionality. FIG. 1 depicts a few examples of such equipment and the examples depicted are by no means exhaustive. As seen in FIG. 1, home/office 2 may include a computer workstation 10 connected to network 1. Computer workstation 10 will be discussed in more detail with reference to FIG. 2, but it is preferably a personal computer (PC) running a windowing operating system. Computer 10 may also be connected to various external devices (not shown) such as printers, scanners, etc. which can be utilized to input and output data.

In the practice of the invention, computer 10 may further include a credit card reader 11. Credit card reader 11 may be a peripheral device such as any known magnetic card reader in which a credit card is swiped through the device. Alternatively, rather than being an external peripheral device, credit card reader 11 may be integrated with computer 10 such as any known credit card reader which is incorporated into a keyboard. The use of credit card reader 11 commensurate with the invention will be discussed in more detail below, but for the time being, suffice to say that credit card reader 11 may be utilized as one way to input credit card information into computer 10. However, a credit card reader is not necessarily required to practice the invention and other means of inputting credit card information can also be utilized. In this regard, one function of computer 10 commensurate with the invention is to input credit card information that is then uploaded as part of a print job to network print service provider 5. This process will be described in more detail below.

A computing device contained in hotel room 3 may also communicate via network 1 with various entities connected to network 1. In this regard, although not shown in FIG. 1, a computer workstation similar to computer 10 may be included in hotel room 3. However, since most hotels generally do not provide a computer workstation in their guest rooms, but rather only include plug-in connections for the hotel's guests to use their own computer to access the network, hotel room 3 is depicted with a user's laptop computer 12 instead of a workstation. Accordingly, a user can connect laptop computer 12 to network 1 from hotel room 3, thereby allowing the user to communicate with other entities on network 1. As such, a user can perform the same operations as described above with regard to home/office 2 and computer 10 such as transmitting credit card information as part of a print job to network print service provider 5 via network 1.

While home/office 2 and hotel room 3 are depicted as having a hard-wired connection to network 1, a hard-wired connection is not necessarily required and a user can connect to the network with a wireless connection. For instance, a user can connect to network 1 using a wireless device such as a handheld palm device (not shown) or a wireless telephone 13. In this regard, many wireless telephones today are web enabled to allow a user to access the Internet to retrieve data and to transmit data to various entities on the network. Accordingly, a user can also use wireless telephone 13 to transmit credit card information and a print job to network print service provider 5 from virtually any geographical location in the world.

Figure 5:
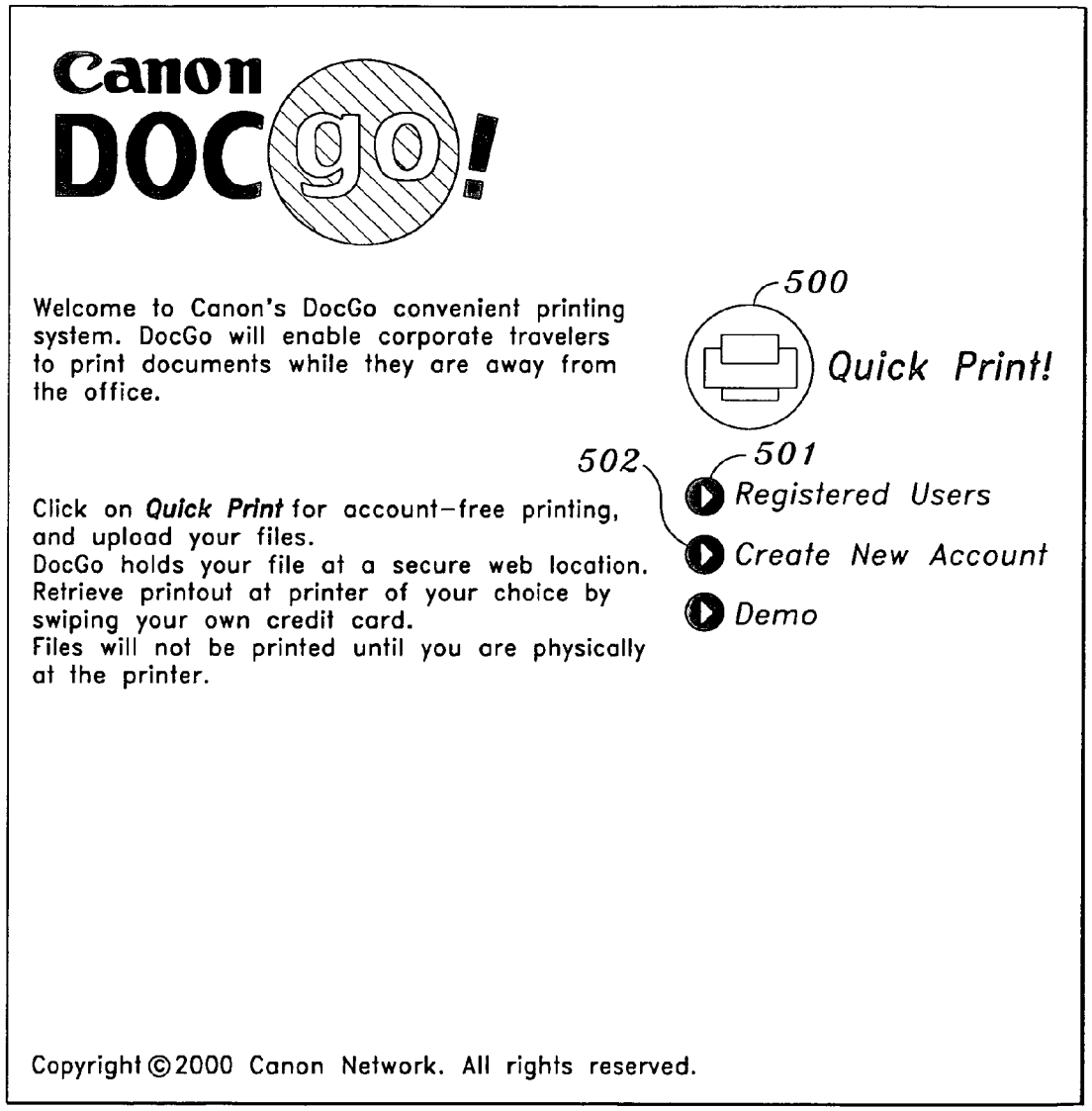
FIG. 5 depicts an example of a home web page for an Internet printing service provider according to the invention.

In the foregoing description, reference has been made to a user transmitting credit card information and print data to network print service provider 5 from any one of home/office 2, hotel room 3 and wireless telephone 13. This process will be described in more detail below, but briefly stated comprises a user accessing a web server in network print service provider 5 to upload a print job. The print job generally includes data files to be printed or a reference to a location where a data file to be printed is stored on the network (such as in network data storage server site 4), and credit card information which is later utilized for retrieving the print job via network 1. For example, a user may activate a web browser on computer 10 and enter a URL in the browser for a network print service provider server, such as http://www.docgo.net. Upon entering the URL, a web page for the entered URL is depicted in the web browser. An example of a web page that may be depicted upon entering the foregoing URL is shown in FIG. 5. After having accessed the foregoing web page, the user can perform various operations to upload the print job.

Network data storage server site 4 preferably includes server 15 connected to network 1. As stated above, a user can upload a print job which includes a reference to a network location where data files to be printed are stored and network data storage server site 4 is one such location. Accordingly, server 15 may be any type of server that stores data files such as word processing documents, spreadsheets, slide show presentations, images, etc., that can be retrieved over the network. In this regard, data files stored in server 15 can be retrieved by computer 10 and uploaded to server 18 at network print service provider 5, or alternatively, can be retrieved by server 18 to be downloaded to a printer located at hotel lobby 7 or office/kiosk 6.

Hotel lobby 7 preferably includes printer 21 which can print a print job submitted to it over network 1. Also depicted in hotel lobby 7 as separate devices are network interface device 25 and credit card reader 23. Although depicted as separate devices, network interface device 25 and credit card reader 23 may be incorporated into printer 21. Credit card reader 23 may be similar to credit card reader 11 and any known type of credit card reader could be employed. Network interface device 25 will be described in more detail below with reference to FIG. 4. Briefly however, network interface device 25 provides functionality for the input of credit card information from credit card reader 23, transmission of the credit card information to server 18 in network print service provider 5, receiving print data to be printed from server 18, and submitting the print data, either directly or via a local network, or via network 1, to printer 21 for printing. In an alternative embodiment that will be described in more detail below, network interface device 25 may perform a hash algorithm on the credit card information and transmit the hash value to server 18 rather than transmitting the credit card information itself.

Office/kiosk 6 is similar to hotel lobby 7 in that it also contains a printing device in which print data can be retrieved via network 1 and printed. Office/kiosk 6 preferably includes at least one printing device (such as copier/printer 22) connected to network 1. Copier/printer 22 may be a printing device similar to printer 21 or any other type of printing device, and also includes a network interface device and a credit card reader such as those shown in hotel lobby 7. In this regard, for simplicity, a network interface device and credit card reader are not depicted as separate devices in office/kiosk 6, but rather, have been incorporated in copier/printer 22.

Figure 2:
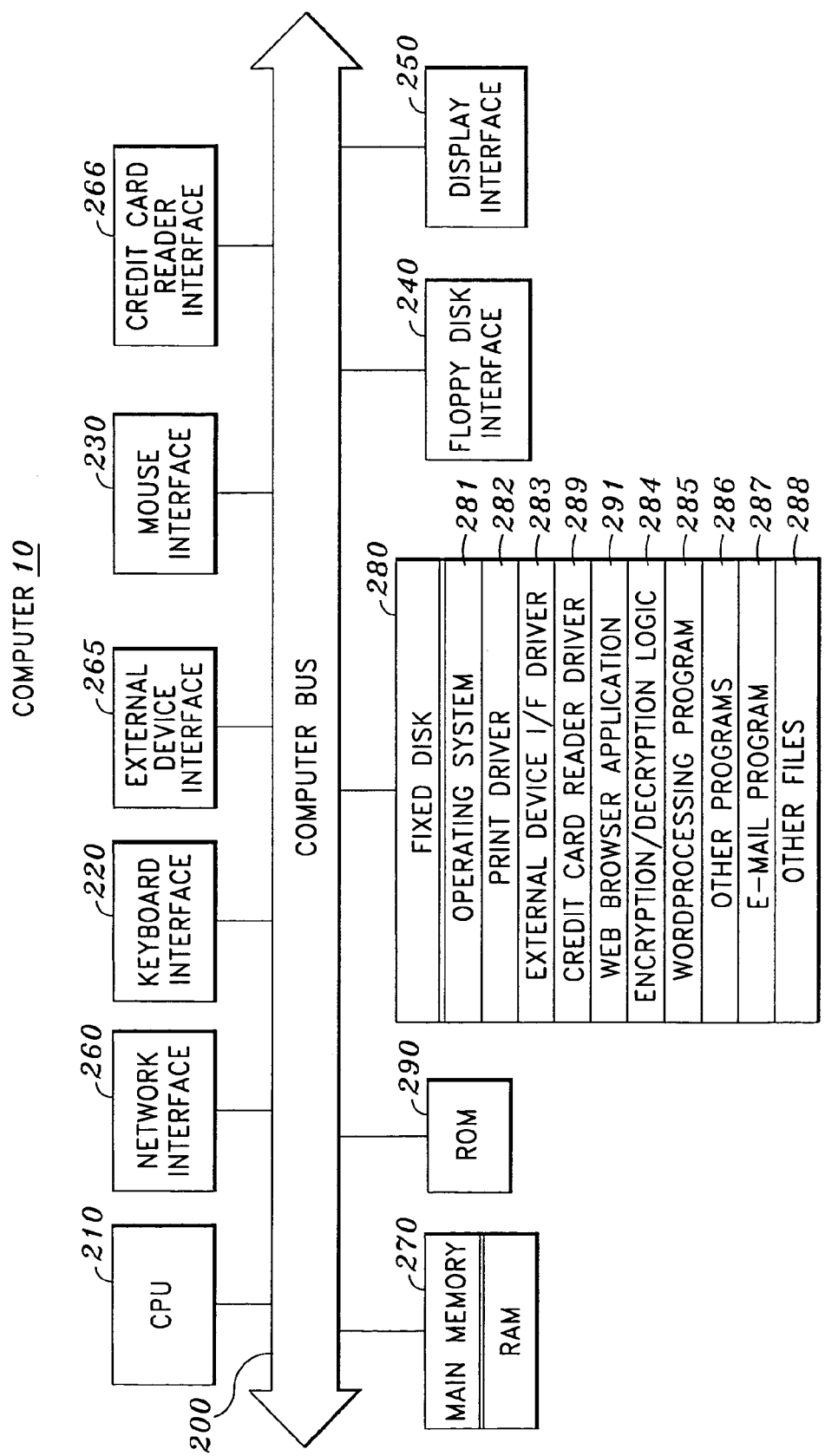
FIG. 2 is a block diagram depicting an internal architecture of a computer used for uploading a print job according to the invention.

FIG. 2 depicts an internal architecture for computer 10. A similar architecture may also be included within laptop 12. In FIG. 2, computer 10 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a pointing device, floppy disk interface 240 for interfacing to a floppy disk, display interface 250 for interfacing to a display, network interface 260 for interfacing to network 1, external device interface 265 for interfacing to various external devices such as a printer, scanner, etc., and credit card reader interface 266 for interfacing to credit card reader 11.

Random access memory (RAM) 270 interfaces to computer bus 200 to provide CPU 210 with access to memory storage, thereby acting as the main runtime memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to computer 10.

Fixed disk 280 is one example of a computer-readable medium that stores program instruction sequences executable by CPU 210 so as to constitute operating system 281, print driver 282, external device interface driver 283, encryption/decryption logic 284, word processing program 285, other programs 286, email program 287, other files 288, credit card reader driver 289 and web browser application 291. Operating system 281 is preferably a windowing operating system, although other types of operating systems may be used with the present invention. Print driver 282 is utilized to prepare image data for printing. Credit card reader driver 289 is utilized to drive and control credit card reader interface 266 for interfacing with credit card reader 11. Encryption/decryption logic 284 may be utilized to perform various encryption or hash algorithms, such as Secure Hash Algorithms (SHA), for encrypting data to be transmitted via network 1. Encryption/decryption logic 284 may also be part of Secure Sockets Layer (SSL) for securely transmitting data over network 1.

Word processing program 285 may be any typical word processing program for creating documents and images, such as Microsoft Word, or Corel WordPerfect documents. Other programs 286 contains other programs necessary to operate desktop computer 10 and to run desired applications. Email program 287 may be a typical email program such as Microsoft Outlook or Lotus cc:Mail that allows desktop computer 10 to receive and send email messages over network 1. Other files 288 may include any other files necessary for the operation of desktop computer 10 or files created and/or maintained by other application programs on desktop computer 10. Web browser application 291 may be any type of web browser application such as Microsoft Internet Explorer or Netscape Navigator which provides a user interface for accessing the Internet.

Credit card reader driver 289 and encryption/decryption logic 284 may operate in conjunction with one another to perform various operations for inputting credit card information and transmitting the credit card information via network 1. For instance, when a user swipes a credit card through credit card reader 11, credit card reader driver 289 may read the information and submit it to encryption/decryption logic 284 for an encryption process. Upon receiving the credit card information, encryption/decryption logic may perform any one of various known encryption or hash algorithms to securely transmit the credit card information over network 1. In the preferred embodiment of the invention, the credit card information is transmitted over network 1 by computer 10 via SSL protocol. However, the credit card information may be hashed with the hash value then being transmitted via network 1 to server 18.

Figure 3:
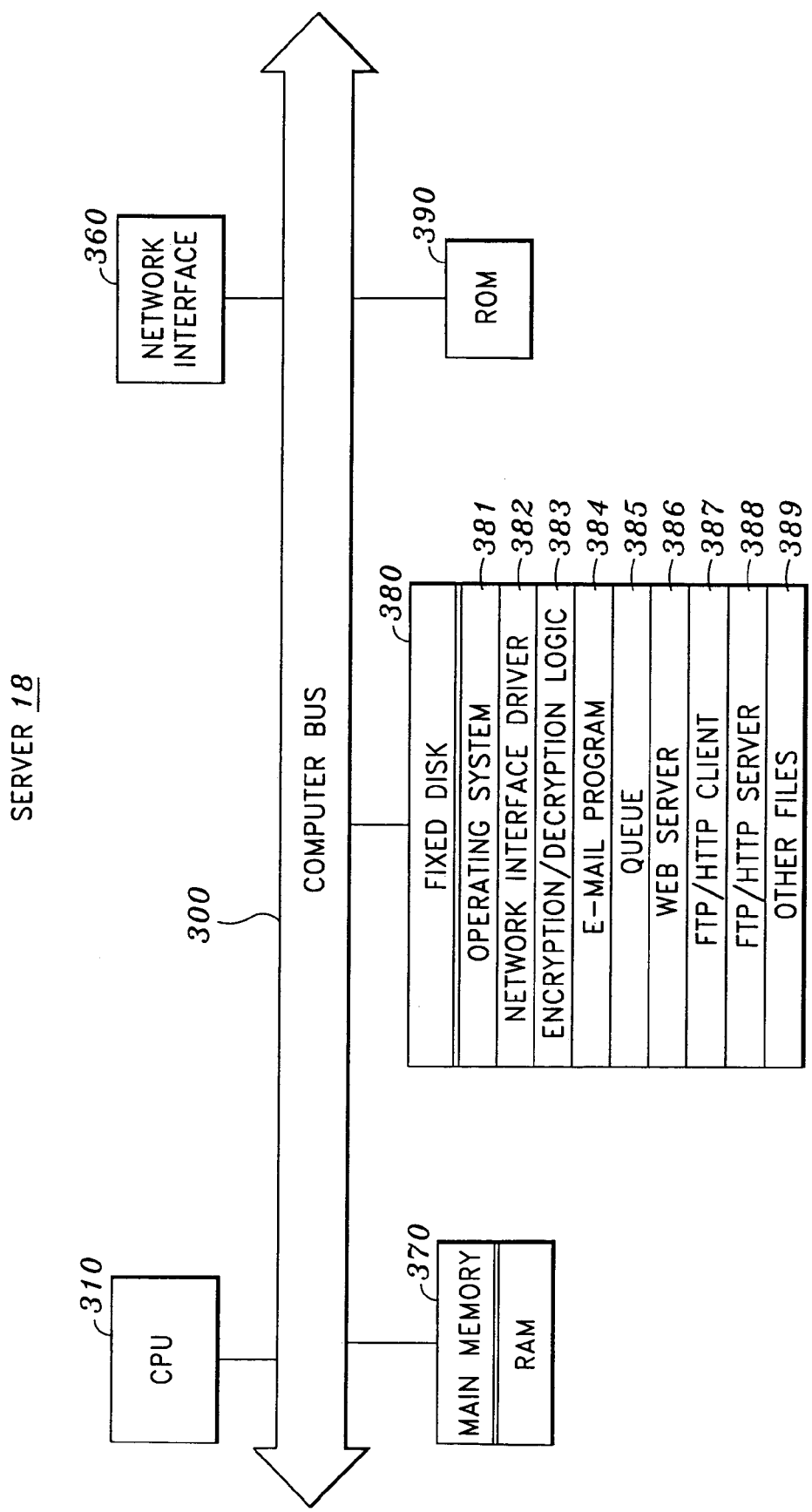
FIG. 3 is a block diagram depicting an internal architecture of a print data storage server.

FIG. 3 depicts an example of an internal architecture for server 18 of network print service provider 5. The architecture of server 18 is seen to include a central processing unit (CPU) 310 such as a programmable microprocessor which is interfaced to computer bus 300. Also coupled to computer bus 300 is a network interface 360 for interfacing to network 1. In addition, random access memory (RAM) 370, fixed disk 380, and read-only memory (ROM) 390 are also coupled to computer bus 300. RAM 370 interfaces to computer bus 300 to provide CPU 310 with access to memory storage, thereby acting as the main run-time memory for CPU 310. In particular, when executing stored program instruction sequences, CPU 310 loads those instruction sequences from fixed disk 380 (or other memory media) into RAM 370 and executes those stored program instruction sequences out of RAM 370. It should also be recognized that standard disk-swapping techniques allow segments of memory to be swapped to and from RAM 370 and fixed disk 380. ROM 390 stores invariant instruction sequences, such as start-up instruction sequences for CPU 310 or basic input/output operating system (BIOS) sequences for the operation of peripheral devices (not shown) which may be attached to server 18.

Fixed disk 380 is one example of a computer-readable medium that stores program instruction sequences and other files executable by CPU 310 so as to constitute operating system 381, network interface driver 382, encryption/decryption logic 383, e-mail program 384, queue 385, web server 386, FTP/HTTP client 387, FTP/HTTP server 388, and other files 389. Operating system 381 can be an operating system such as DOS, Windows 95, Windows 98, Windows NT, UNIX, Novell Netware or any other such operating system. Network interface driver 382 is utilized to drive network interface 360 for interfacing server 18 to network 1. E-mail program 384 is a typical e-mail program and enables server 18 to receive and/or send e-mail messages over network 1. Queue 385 is utilized to store numerous print jobs that may be uploaded to server 18. Other files 389 contains other files or programs necessary to operate server 18 and/or to provide additional functionality to server 18. Web server 386 acts to provide server 18 with functionality as a server on the Internet. As such, web server 386 includes a network address that identifies server 18 on the Internet. FTP/HTTP client 387 provides server 18 with the ability to transmit and retrieve data files via FTP (File Transfer Protocol) and HTTP (Hypertext Transport Protocol) protocols over the network through network interface 360. Additionally, FTP/HTTP server 388 of server 18 can be accessed by an FTP/HTTP client of a printer, a computer workstation such as computer 10 or any other type of device, such as network interface device 25.

Encryption/decryption logic 383 may comprise any known encryption or hash algorithm. In one embodiment of the invention, upon receiving print data and credit card information via network 1 from computer 10, the credit card number may be subjected to a hash algorithm, such as SHA-1. The hash value is then stored in a correspondence table in server 18 with its associated print data.

Figure 4:
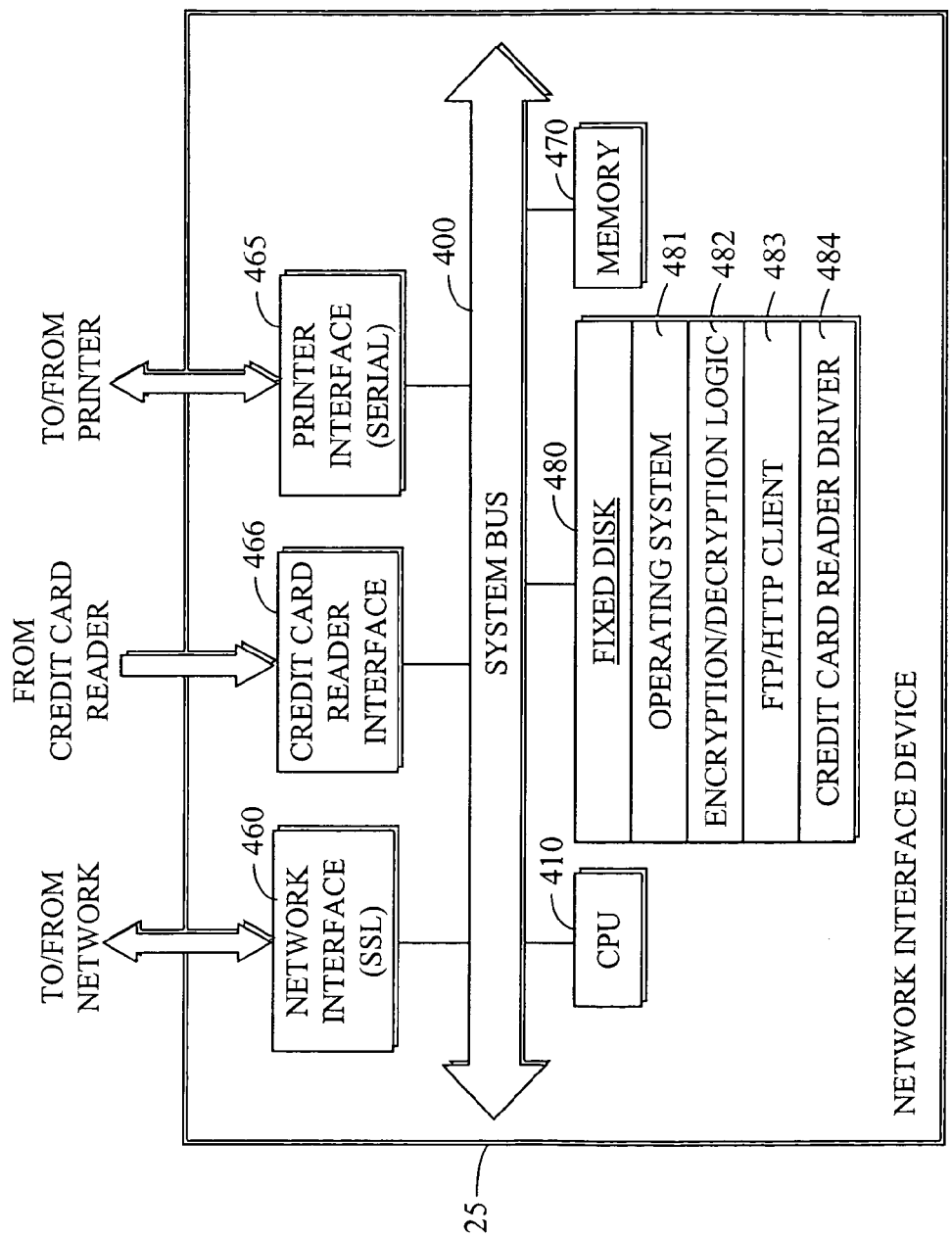
FIG. 4 is a block diagram depicting an internal architecture of a network interface device for printing a print job according to the invention.

FIG. 4 depicts an example of an internal architecture of network interface device 25. As stated above, network interface device 25 may be a device external to a printer, such as that shown in hotel lobby 7, or may be incorporated (embedded) within the printer, such as copier/printer 22. Regardless of whether the device is external or embedded in a printer, the functionality and architecture of the network interface device are similar. As seen in FIG. 4, network interface device 25 may include an architecture along the lines of a personal computer. That is, it may include CPU 410, memory 470, network interface 460, credit card reader interface 466, printer interface 465 and fixed disk 480, all of which are connected to system bus 400. Network interface 460 preferably utilizes Secure Sockets Layer (SSL) protocol for transmitting and receiving information via network 1. Credit card reader interface 466 is connected to credit card reader 23 and is similar to credit card reader interface 266. Printer interface 465 may be a serial connection, a parallel connection, a USB (Universal Serial Bus) connection, or a network connection (either local or remote) connected to printer 21 for transmitting data to printer 21. For simplicity, FIG. 4 depicts a serial interface directly connected to printer 21.

Fixed disk 480 is preferably a hard disk similar to fixed disk 280, but may be a solid state memory instead, such a flash memory. Fixed disk 480 preferably includes application programs such as operating system 481, encryption/decryption logic 482, FTP/HTTP client 483, and credit card reader driver 484. Operating system 481 is preferably an embedded operating system, such as VXWorks, but may be any other type of operating system which includes functionality for transmitting credit card information over network 1 to server 18 and for receiving print data and submitting it to a printer for printing. Credit card reader driver 484 and encryption/decryption logic 482 may be similar to those described above with regard to encryption/decryption logic 284 (i.e. SSL, SHA-1, etc.) and credit card reader driver 289. Network interface device 25 preferably utilizes SSL to securely transmit credit card information and to receive print data via network interface 460. Alternatively, any known encryption and/or hash algorithm may be used to hash the credit card information with the hash value being transmitted to server 18. FTP/HTTP client 483 receives and transmits print data over network 1 via the FTP or HTTP protocols.

A more detailed description of the operation of network interface device 25 will be described below with respect to FIGS. 11 to 13, but briefly stated, when a user swipes a credit card through credit card reader 23 connected to network interface device 25, the credit card information is read by credit card reader driver 484 and is transmitted via network interface 460 to server 18. Alternatively, network interface device hashes the credit card information and transmits the hash value to server 18. Network interface device 25 then receives print data from server 18 that it transmits to printer 21, either via a local network or through printer interface 465.

Figure 6:
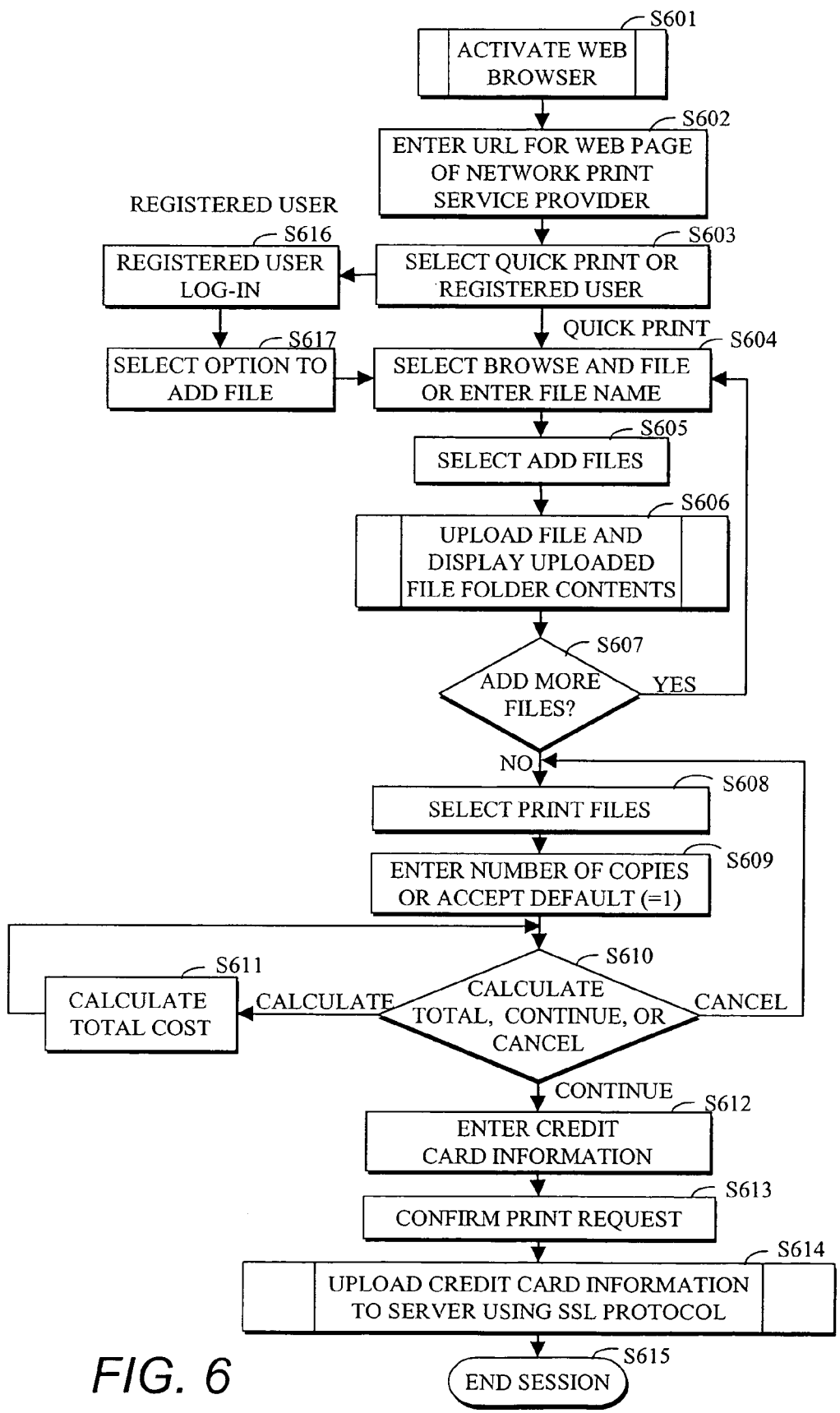
FIG. 6 is a flowchart depicting process steps for uploading a print job.

FIG. 6 is a flowchart depicting process steps for uploading a print job from, for example, computer 10 to server 18. The process steps of FIG. 6 will be described in conjunction with the user interface screens depicted in FIGS. 5 and 14 through 30.

Figure 14:
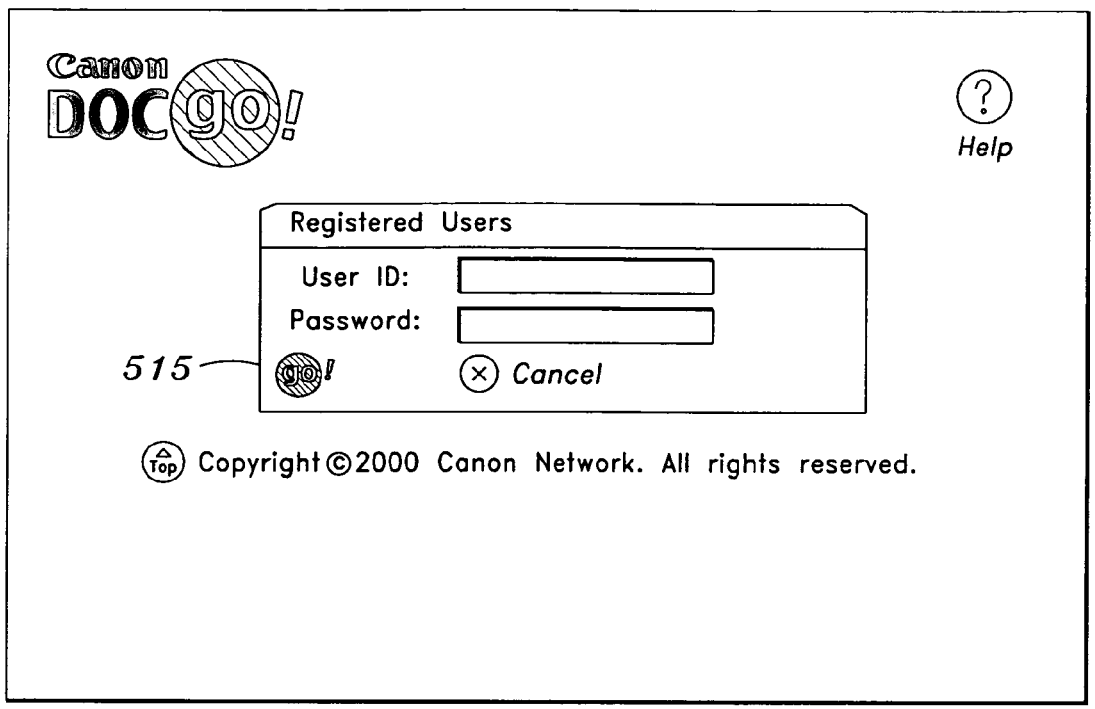
FIG. 14 depicts a user interface window for a registered user to log-in to an Internet printing website.
Figure 15:
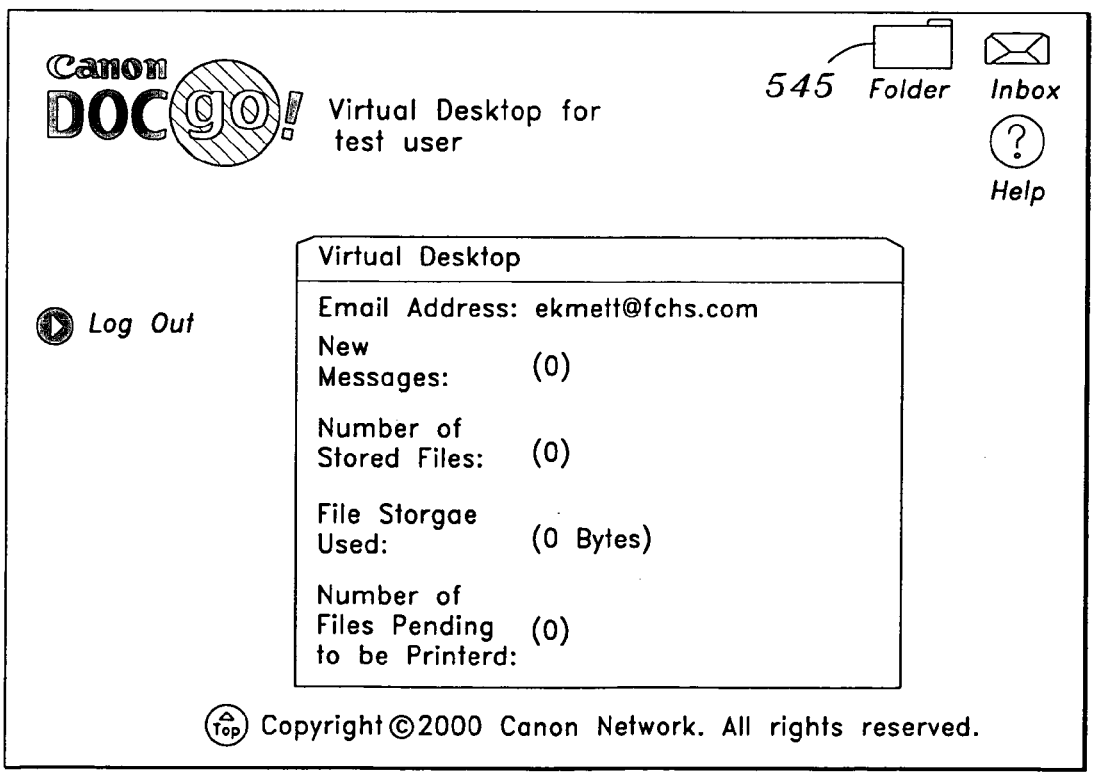
FIG. 15 depicts a user interface window of a virtual desktop for a registered user.
Figure 16:
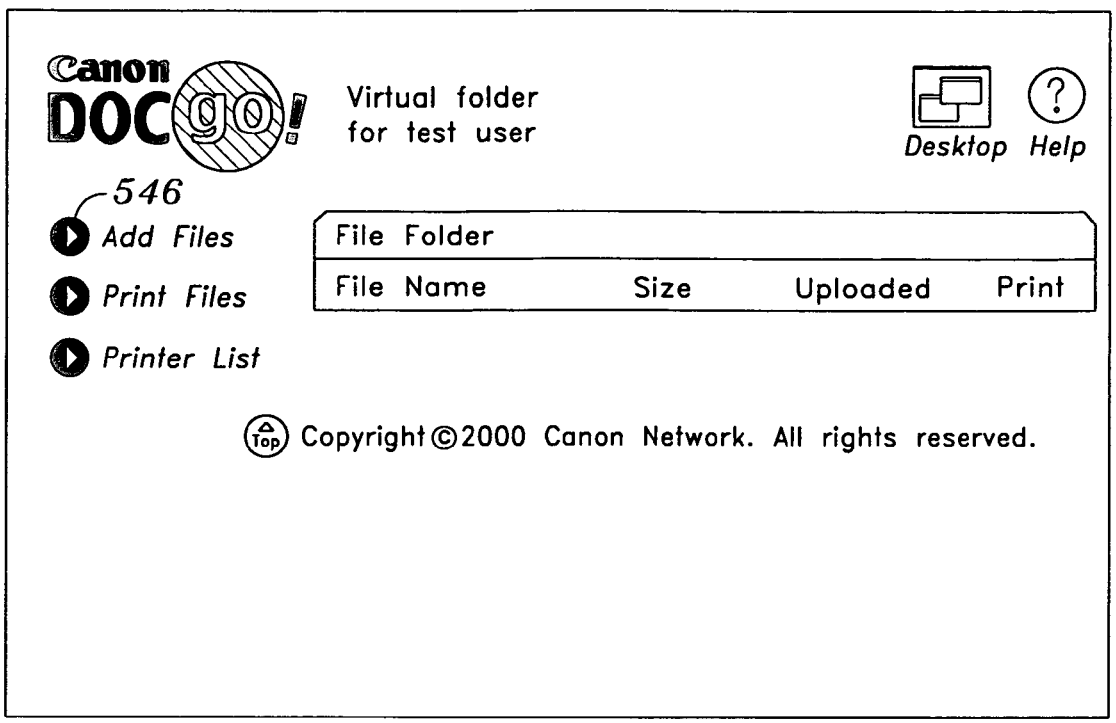
FIG. 16 depicts a user interface window for a virtual folder of a registered user.
Figure 17:
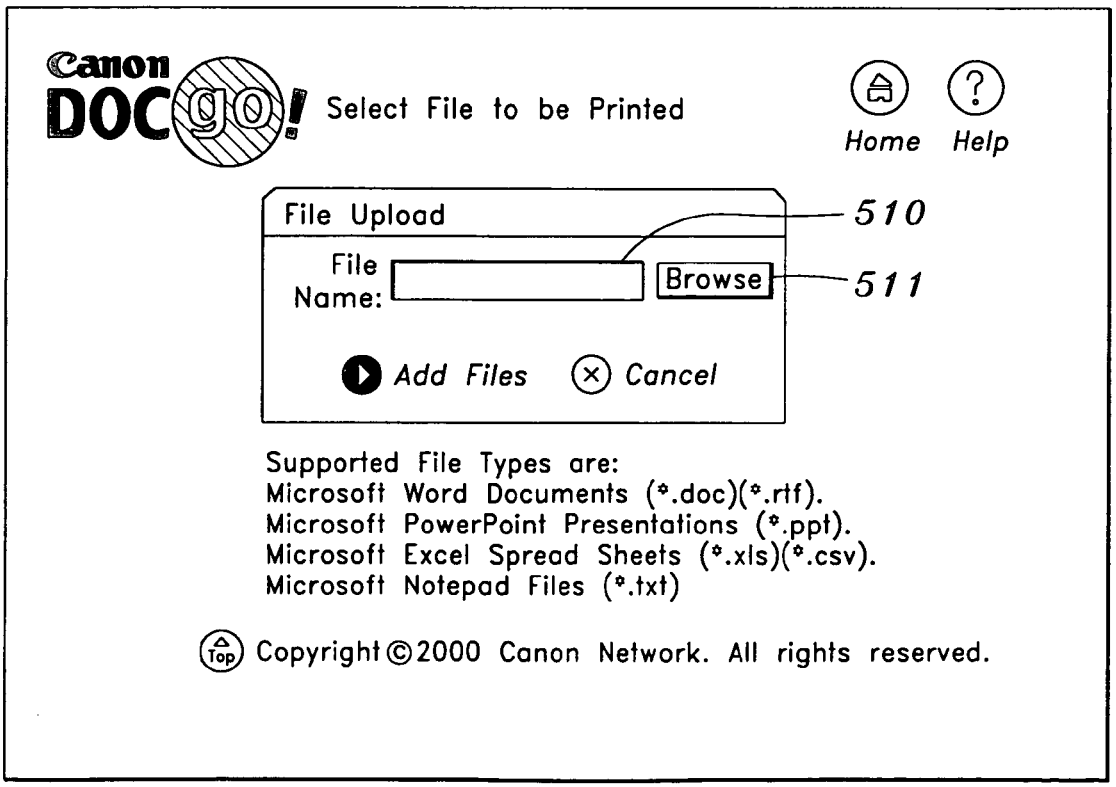
FIG. 17 depicts a user interface window for adding a file to upload.
Figure 18:
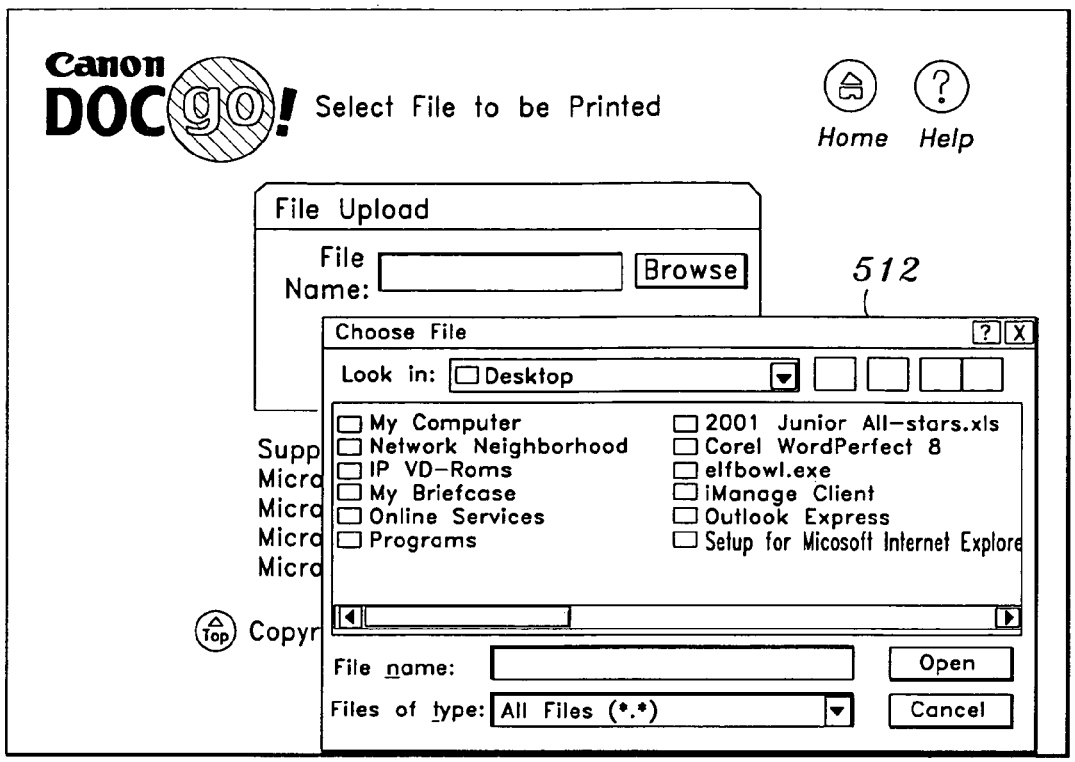
FIG. 18 depicts a user interface window for browsing for a file to upload.
Figure 30:
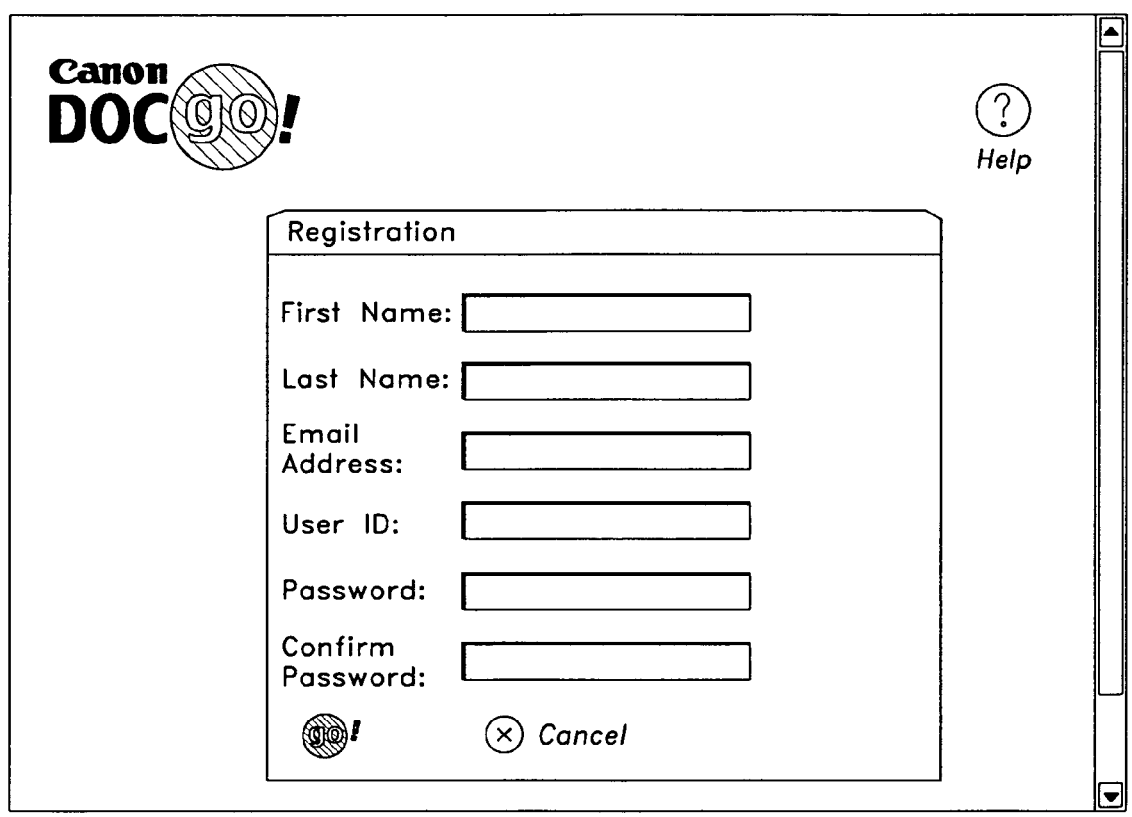
FIG. 30 depicts a user interface window for a user to register as a registered user.

As seen in FIG. 6, to begin the process a user activates a web browser application (step S601) and enters the URL for an Internet printing service provider to establish an Internet connection with, for example, server 18 (step S602). One such URL for an Internet printing service provider is http://www.docgo.net. Upon entering the foregoing URL, a home web page for the Internet printing service provider, such as that shown in FIG. 5, is depicted in the web browser. Once the home web page is depicted in the web browser, the user selects an option to upload a print job. This step (step S603) may comprise the user selecting a Quick Print option 500 or a Registered Users option 501 as depicted in FIG. 5. In a case where a user selects Quick Print option 500, a user interface screen such as that shown in FIG. 17 is displayed. In a case where a user selects Registered Users option 501, a user interface screen such as that shown in FIG. 14 is displayed. If the user has not yet registered as a registered user, the user can select Create New Account button 502 in FIG. 5, whereby the user interface window of FIG. 30 is depicted and the user enters the requested information to register as a registered user. Once the user has been established as a registered user, in the interface of FIG. 14, the user enters his/her username and password (step S616) and selects GO button 515. Upon selecting GO button 515, an interface screen such as that shown in FIG. 15, which presents a virtual desktop for the registered user, is displayed. The registered user then selects Folder button 545, whereby the user interface screen of FIG. 16 is displayed. FIG. 16 depicts a virtual folder that lists all print jobs which have been uploaded to server 18. To add a new print job, the user selects Add Files button 546 (step S617), whereby the user interface screen shown in FIG. 17 is displayed.

Figure 19:
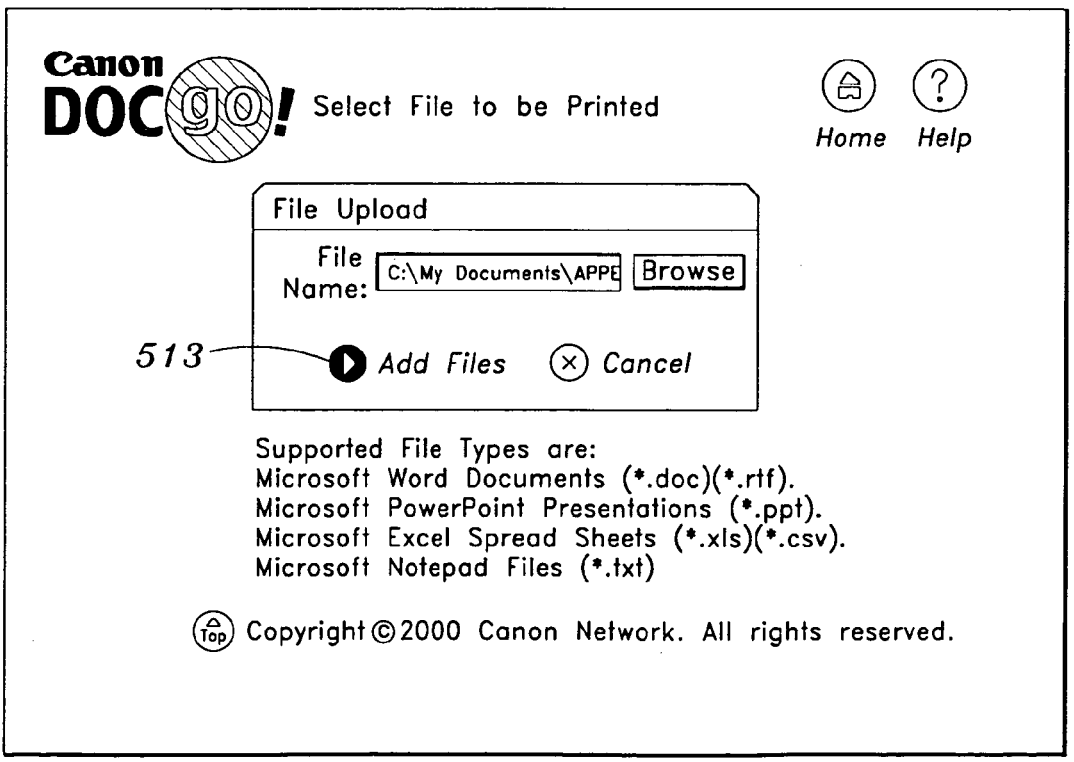
FIG. 19 depicts a user interface window where a user has selected a file to upload.
Figure 20:
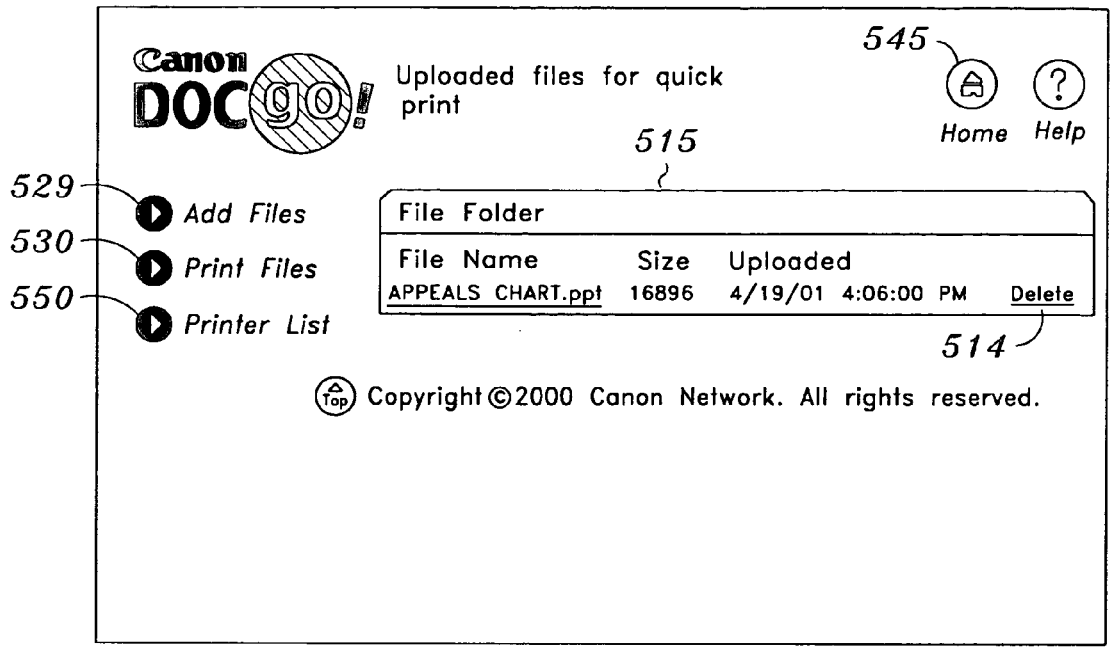
FIG. 20 depicts a user interface window for a file folder containing uploaded files for Quick Print.
Figure 21:
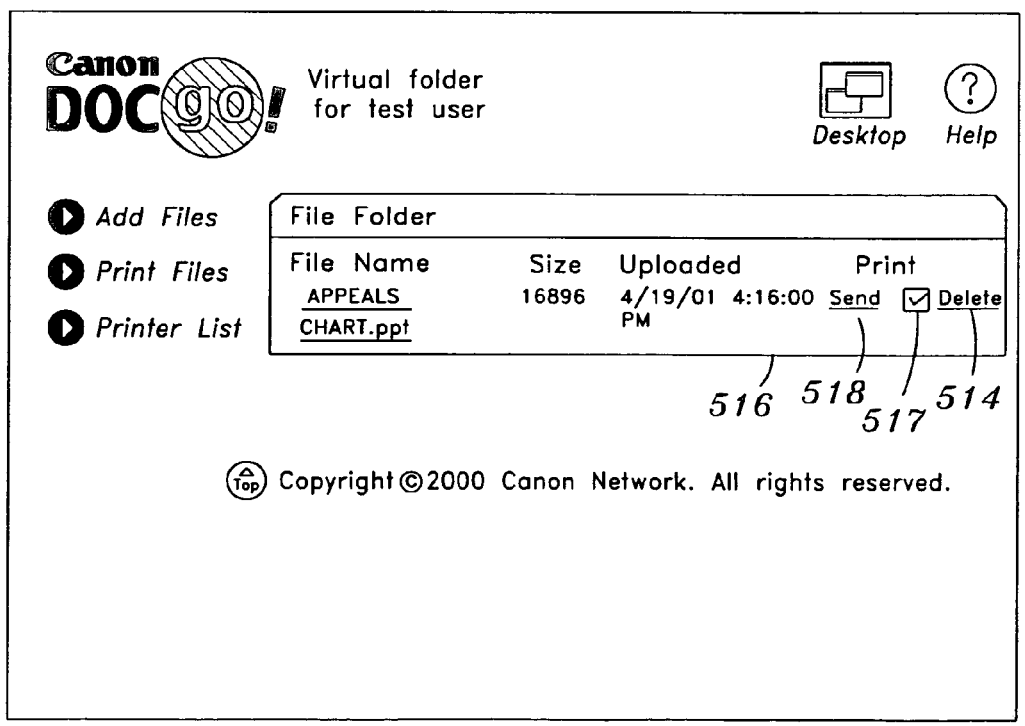
FIG. 21 depicts a user interface window for a file folder for uploaded files for a registered user.

As seen in FIG. 17, the user may either enter the directory path for the file (if known) in File Name box 510 or may select Browse button 511 to locate and select the file or files to be uploaded (step S604 of FIG. 6). If the user selects Browse button 511, a directory explorer window is displayed, such as window 512 shown in FIG. 18. Once the user either enters the directory path and file name in box 510 or selects a file in window 512, the directory path is depicted in box 510 as seen in FIG. 19. The user then selects an option to add the files for uploading (step S605), such as selecting Add Files button 513 seen in FIG. 19. When the user selects Add Files button 513, the selected file(s) are uploaded to server 18 (step S606) and the uploaded files are then depicted in File Folder window 515 as seen in FIG. 20, or File Folder window 516 as seen in FIG. 21.

Figure 22:
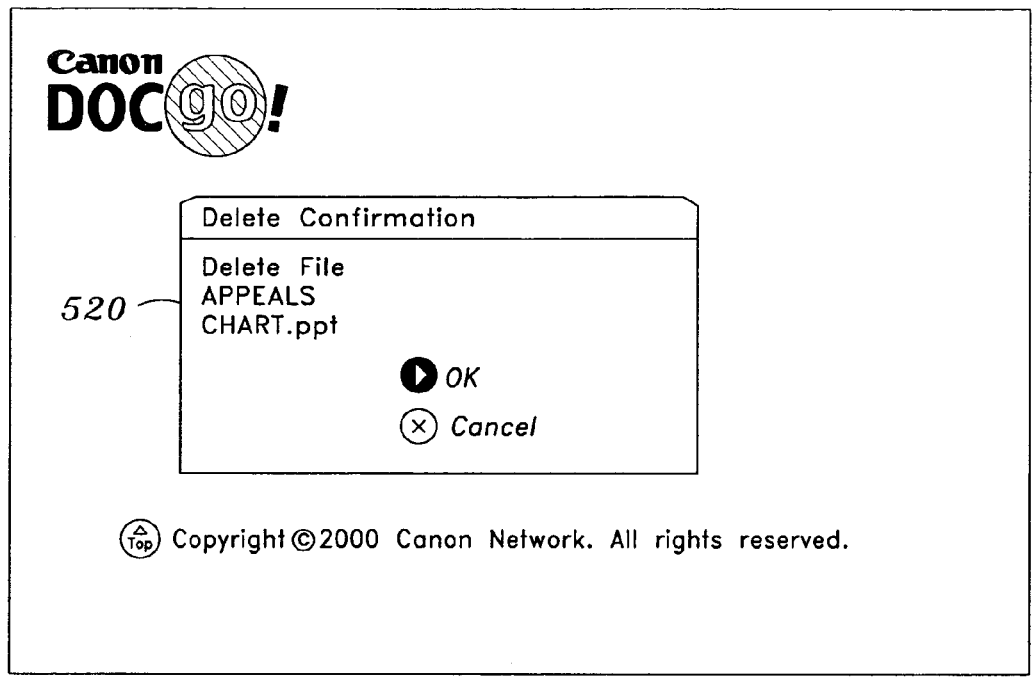
FIG. 22 depicts a user interface window for a delete confirmation.

File Folder window 515 is displayed when the user selects the Quick Print option in step S603, whereas File Folder window 516 is displayed when the user selects the Registered Users option in step S603. Note that windows 515 and 516 are similar with the exception of some additional options being provided in window 516. In this regard, both window 515 and window 516 include delete option 514 to allow the user to delete a selected file that has been uploaded. Upon selecting delete option 514, confirmation window 520 as seen in FIG. 22 is displayed for the user to confirm that he wants to delete the selected file.

However, window 516, unlike window 515, includes additional options for registered users. The additional options may be included to provide registered users with additional services that are not generally available for Quick Print users. Two such additional options may be to allow registered users to utilize server 18 as a storage device in which data files can be uploaded and saved in server 18, and to provide registered users with the ability to send a copy of an uploaded file via email to a recipient of their choice. To provide registered users with the foregoing services, File Folder window 516 includes Print box 521 and send option 522. When a registered user uploads a data file for printing, the file is stored in server 18 and is preferably only printed when the user marks the file as ready for printing. Therefore, Print box 521 can be checked by the user to mark selected files as ready for printing. As such, where more than one file is uploaded by the registered user, the user can select which file(s) are to be printed the next time the user swipes his credit card at a printer merely by marking those files as ready. When the user swipes his credit card, only those files that have been marked for printing will be printed. Accordingly, the user can upload all of the files that he wants to print at the same time, but can mark only some of the files as ready for printing while leaving other files stored in server 18 to be printed at a later time.

Figure 23:
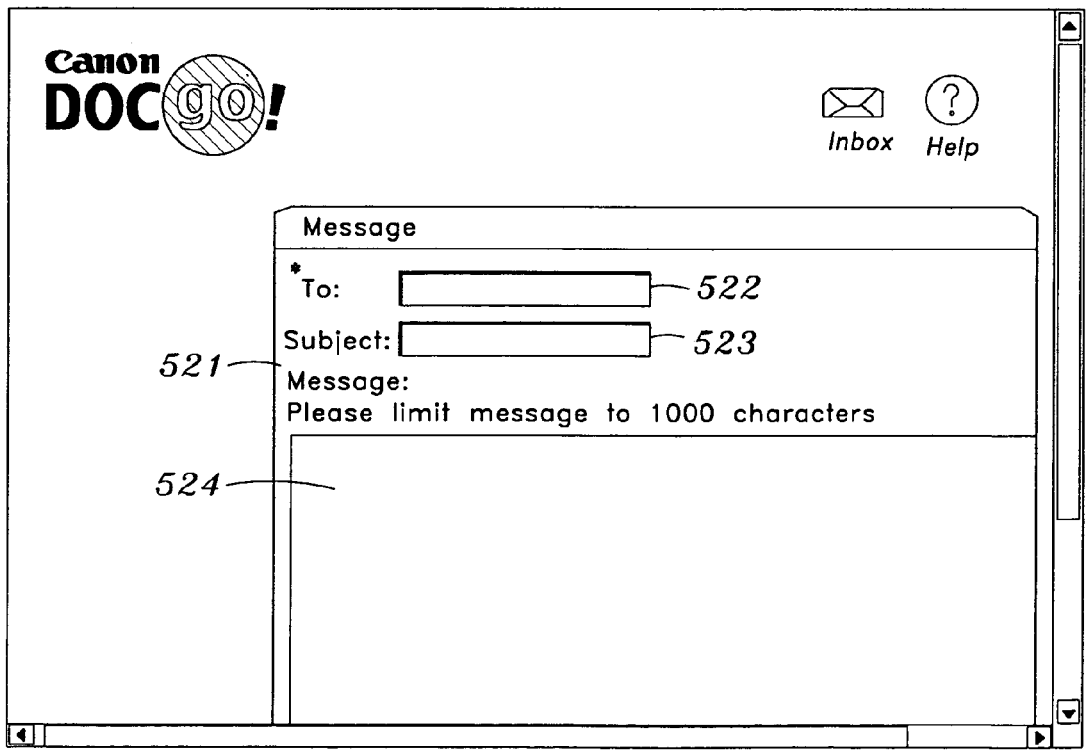
FIG. 23 depicts a user interface window for a registered user to send a file via email.
Figure 24:
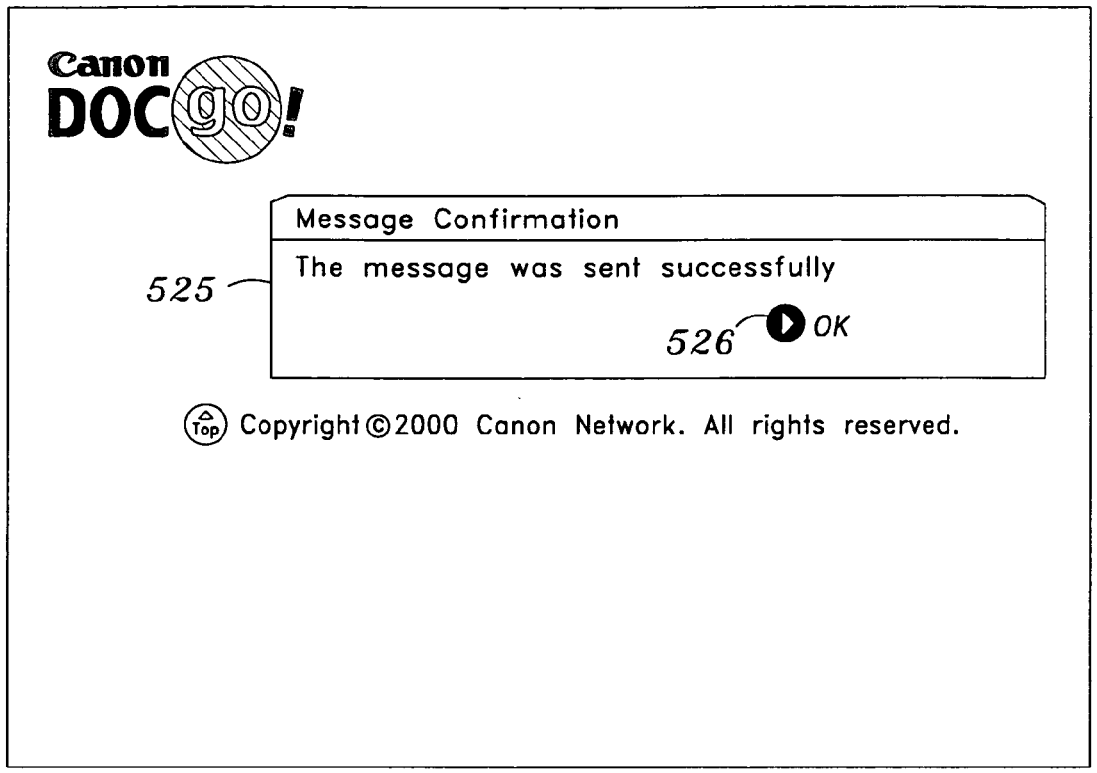
FIG. 24 depicts a user interface window for a sent email confirmation.
Figure 25:
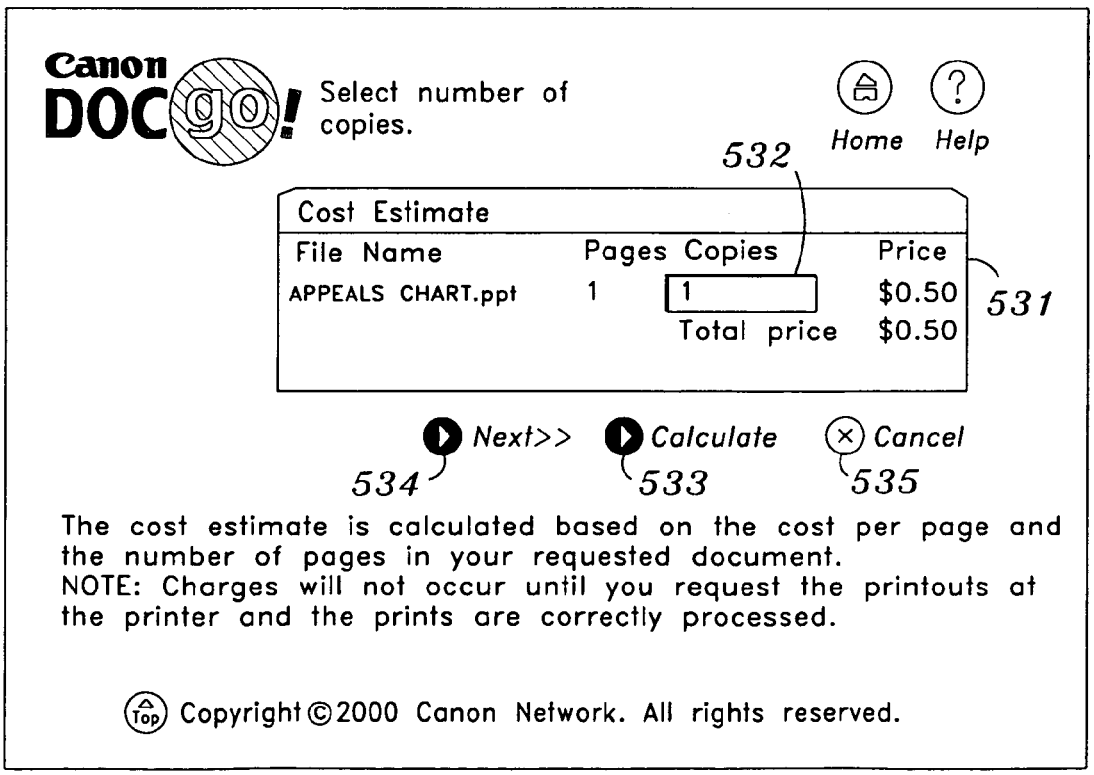
FIG. 25 depicts a user interface window for a user to enter the number of copies for printing.
Figure 28:
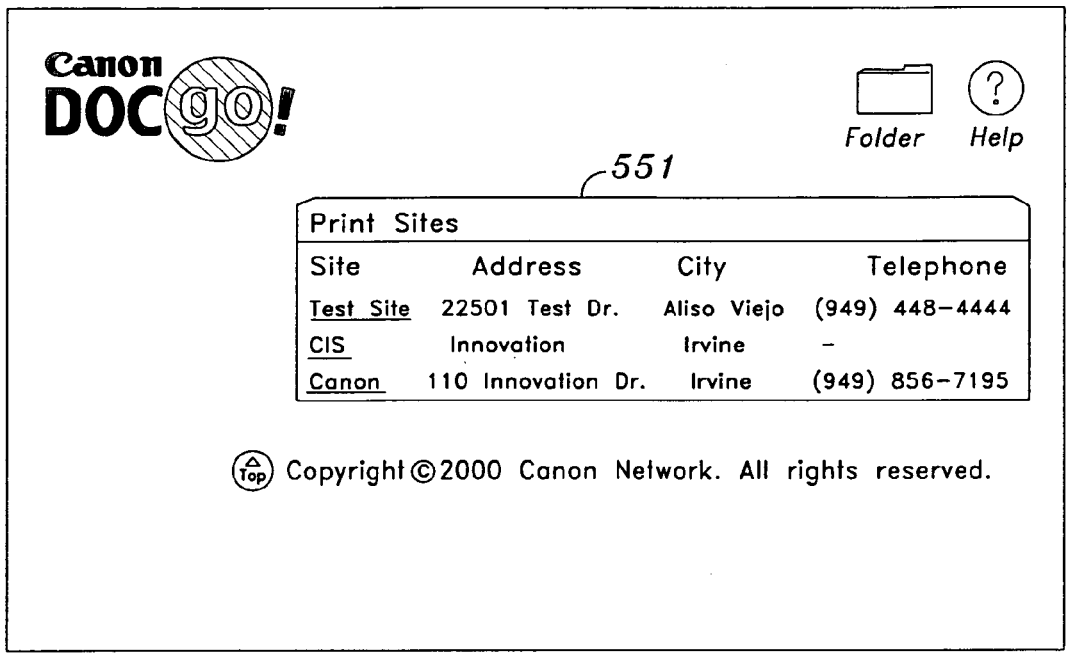
FIG. 28 depicts a user interface window for a printer listing.

Send option 518 provides the user with the ability to send a selected file via email to a recipient of his choice. When a user selects send option 518, a window such as window 521 shown in FIG. 23 is depicted. The file from which the user selects send option 518 is attached to an email message. In window 521, the user enters an email address of the recipient in box 522, a brief description of the subject in box 523, and any message to be included with the email in box 524. The user then selects a send button which activates a confirmation window such as window 525 seen in FIG. 24. If the user confirms that the message is to be sent by selecting OK button 526, the email message, with the selected file attached, is sent to the email address entered in box 522.

Returning again to FIGS. 6 and 20, if the user wants to upload additional files (step S607), the user selects Add Files button 529, whereby flow returns to step S604 for the user to enter the directory path or to browse and select the additional file(s). Once the user has completed uploading data files for printing, the user selects an option to print the selected files (step S608). For example, the user selects Print Files button 530 as seen in FIG. 20. Upon selecting Print Files button 530, the user may be presented with a cost estimate window, such as window 531 seen in FIG. 25. In window 531, the user can enter the total number of copies to be printed in box 532 (step S609) or accept the default number of copies (default=1). Additionally, the user can select calculate button 533 to obtain the total estimated cost (step S610). If the user is not satisfied with the estimated cost, the user can cancel the transaction by selecting cancel button 535 (step S610). If the user is satisfied with the number of copies and the estimated cost of printing, the user selects Next button 534 (step S610).

When the user selects Next button 534, the user is prompted to input credit card information (step S612). As such, a window for entering credit card information, such as window 540 seen in FIG. 26, is depicted. In window 540, the user enters issuer information (e.g. Visa, Mastercard, Discover, American Express, etc.), the credit card number, expiration month and year, and the name of the person to whom the card is issued. The user can either manually type the information in each of the boxes shown in window 540, or alternatively, the user could swipe his credit card through a credit card reader connected to or incorporated within computer 10. Upon swiping the credit card through the credit card reader, the credit card information is obtained by the credit card reader driver and may be automatically input to fill the information boxes depicted in window 540. After having input his credit card information, the user selects Next button 541 in window 540 to continue the print request.

Upon selecting Next button 541, a Print Job Summary window 542 is depicted. Print Job Summary window 542 provides the user with the final particulars for the print request, such as number of pages, number of copies, total number of pages printed, price per page, total cost, credit card number and a confirmation number. The user then confirms the print request (step S613) by selecting OK button 543 in window 542. Upon selecting OK button 543, the user's credit card information is transmitted via Secure Sockets Layer (SSL) (step S614) to server 18. Upon receiving the uploaded credit card information, the information is stored in a correspondence table in server 18, or alternatively, the credit card information is hashed by server 18 and the hash value is stored in the correspondence table. After confirming the print request, the user interface returns to that depicted in FIG. 20 or 21 (depending on whether the user selected Quick Print or Registered Users), with any uploaded files listed in window 515 (if Quick Print) or window 516 (if Registered User).

Figure 29:
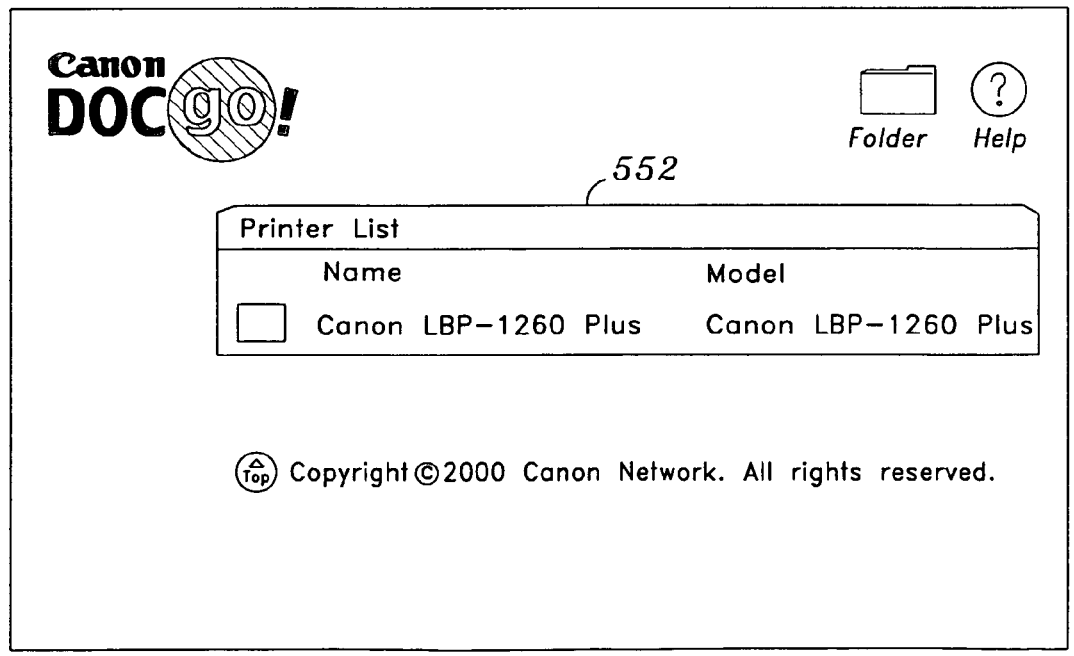
FIG. 29 depicts a user interface window for information of a selected printer.

Referring again to FIGS. 20 and 21, the user can select Printer List button 550 to see a list of available printers from which he can retrieve his print job. In this regard, a listing of available printers is preferably maintained by an Internet printing service provider. In maintaining the listing, merchants who wish to be included in a network of Internet printing providers preferably register with the Internet printing service provider. When the merchant registers with the Internet printing service provider, they are provided with a printer that includes the ability to input credit card information, such as a credit card reader, and a network interface device such as that described with reference to FIG. 4. Thus, the Internet printing service provider can maintain a listing of all printers, including their location, type and capabilities, so that the user can browse the listing to find a printer nearest a location where he/she wants to retrieve this print job. For example, when the user selects Printer List button 550 in FIG. 20, a Print Sites window 551 is depicted which lists all printers that are part of the network. The user can click on any one of the printers listed in window 551, thereby invoking window 552 as seen in FIG. 29, which provides additional detailed information about the selected printer.

When the user has completed uploading files for printing, the user can select Home icon 545 in FIG. 20 to return to the home page as seen in FIG. 5. The user can then log-out of their web browser application, thereby ending the print job upload session (step S615).

Figure 7:
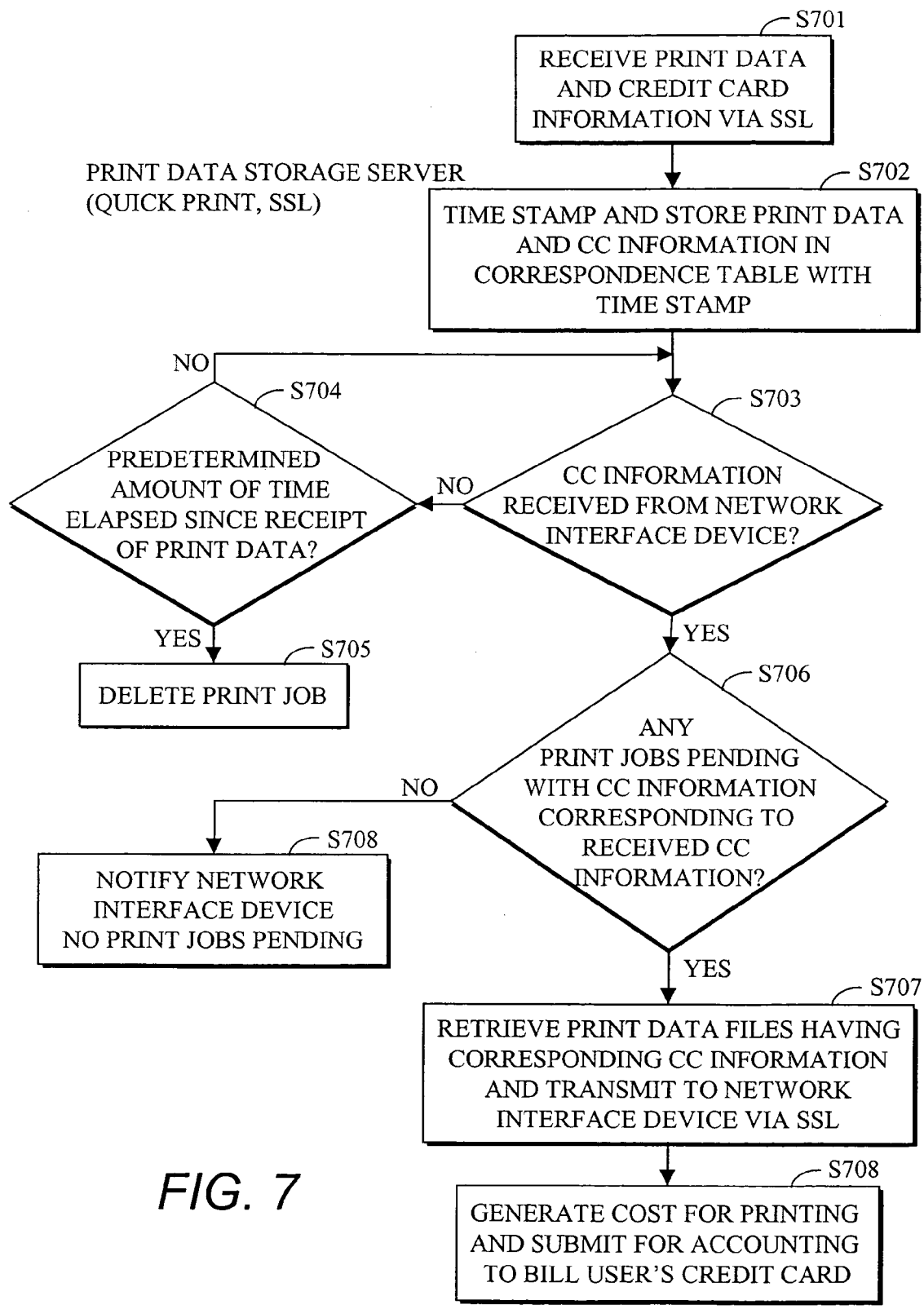
FIG. 7 is a flowchart of process steps performed by an Internet printing server where the user uploads data files utilizing Quick Print and SSL is employed as the secure transmission protocol.
Figure 8:
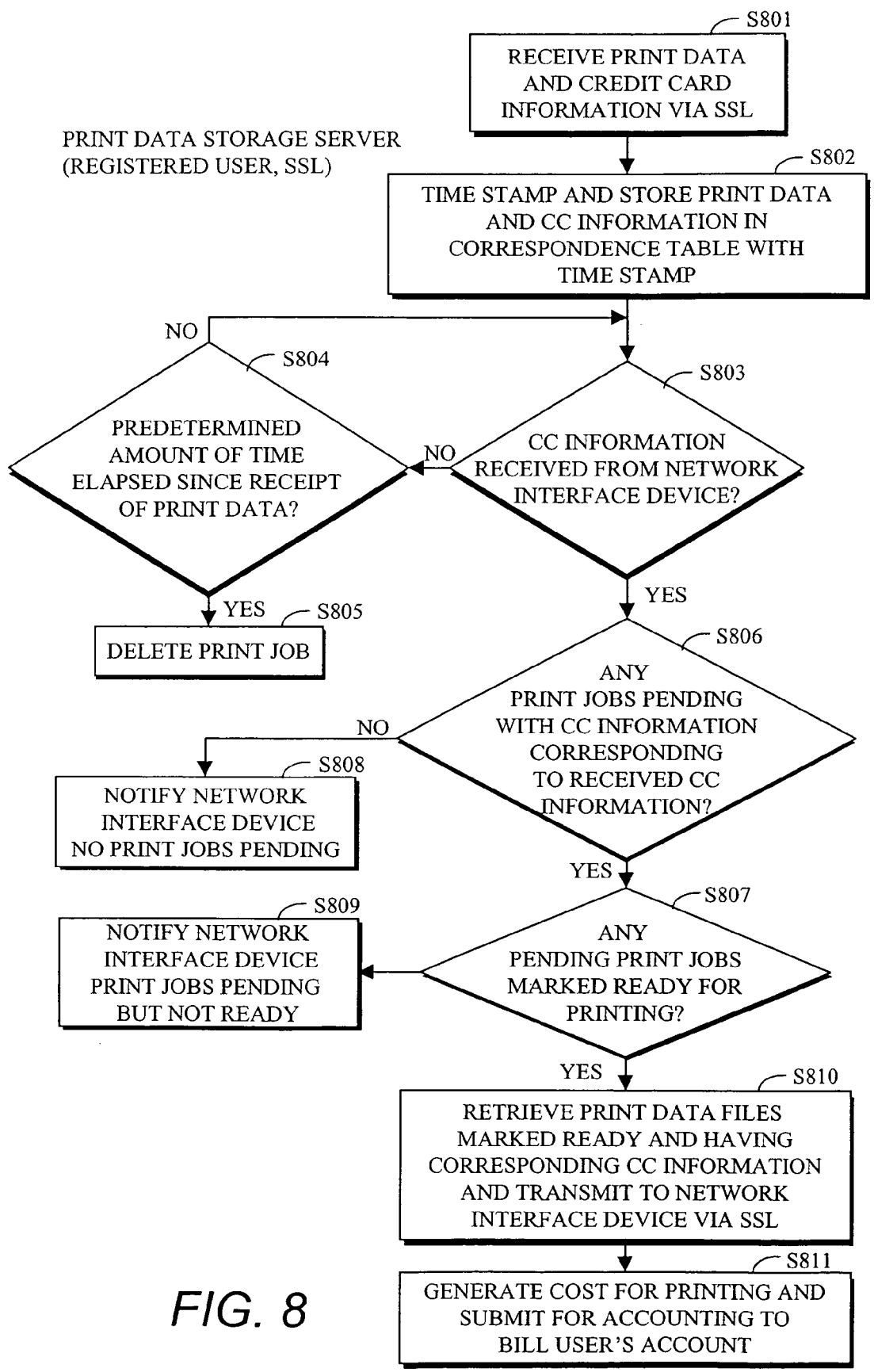
FIG. 8 is a flowchart of process steps performed by an Internet printing server where the user uploads data files utilizing the Registered Users option and SSL is employed.
Figure 9:
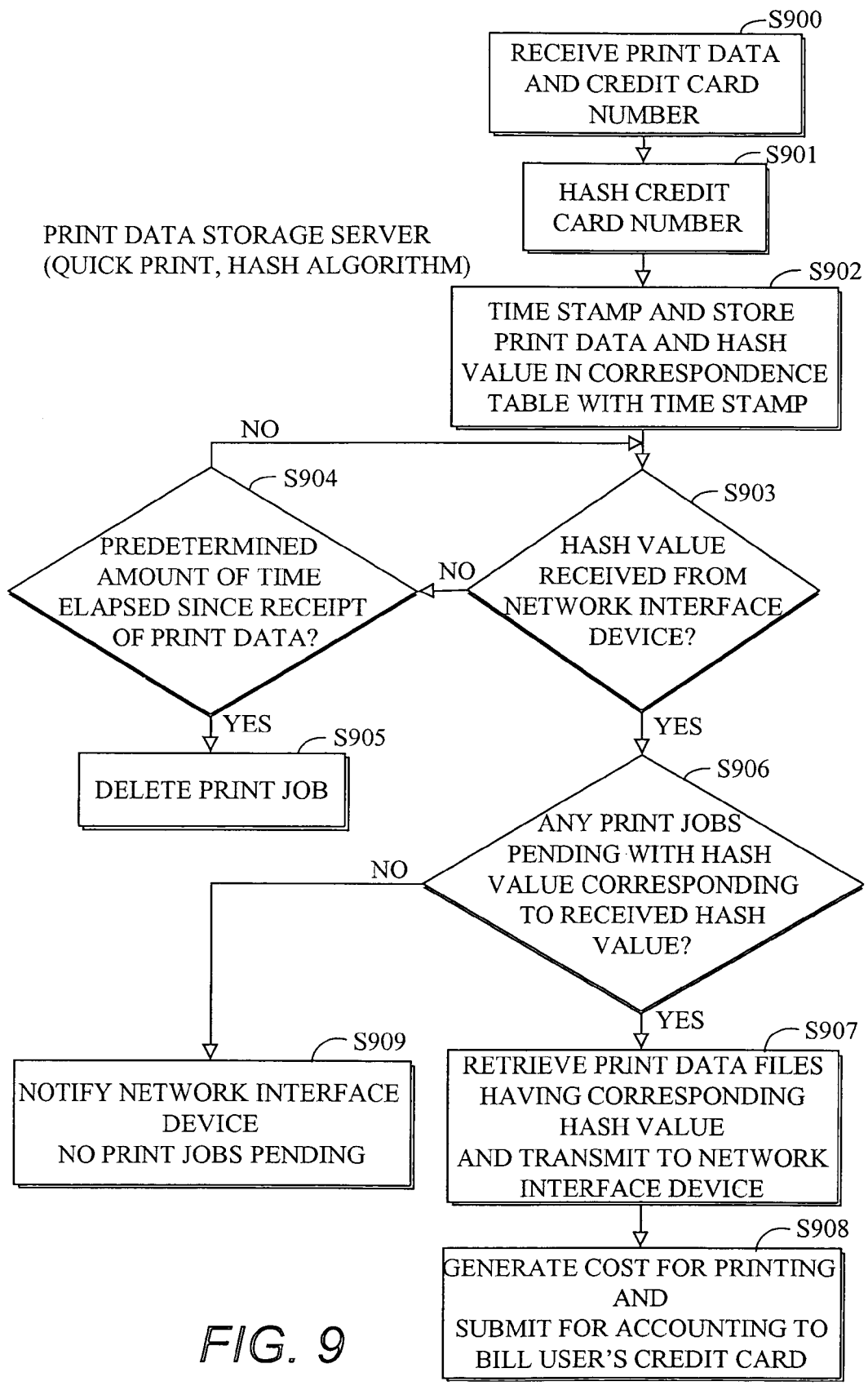
FIG. 9 is a flowchart of process steps performed by an Internet printing server where the user uploads files utilizing Quick Print and a secure hash algorithm is employed for securely transmitting the credit card information.
Figure 10:
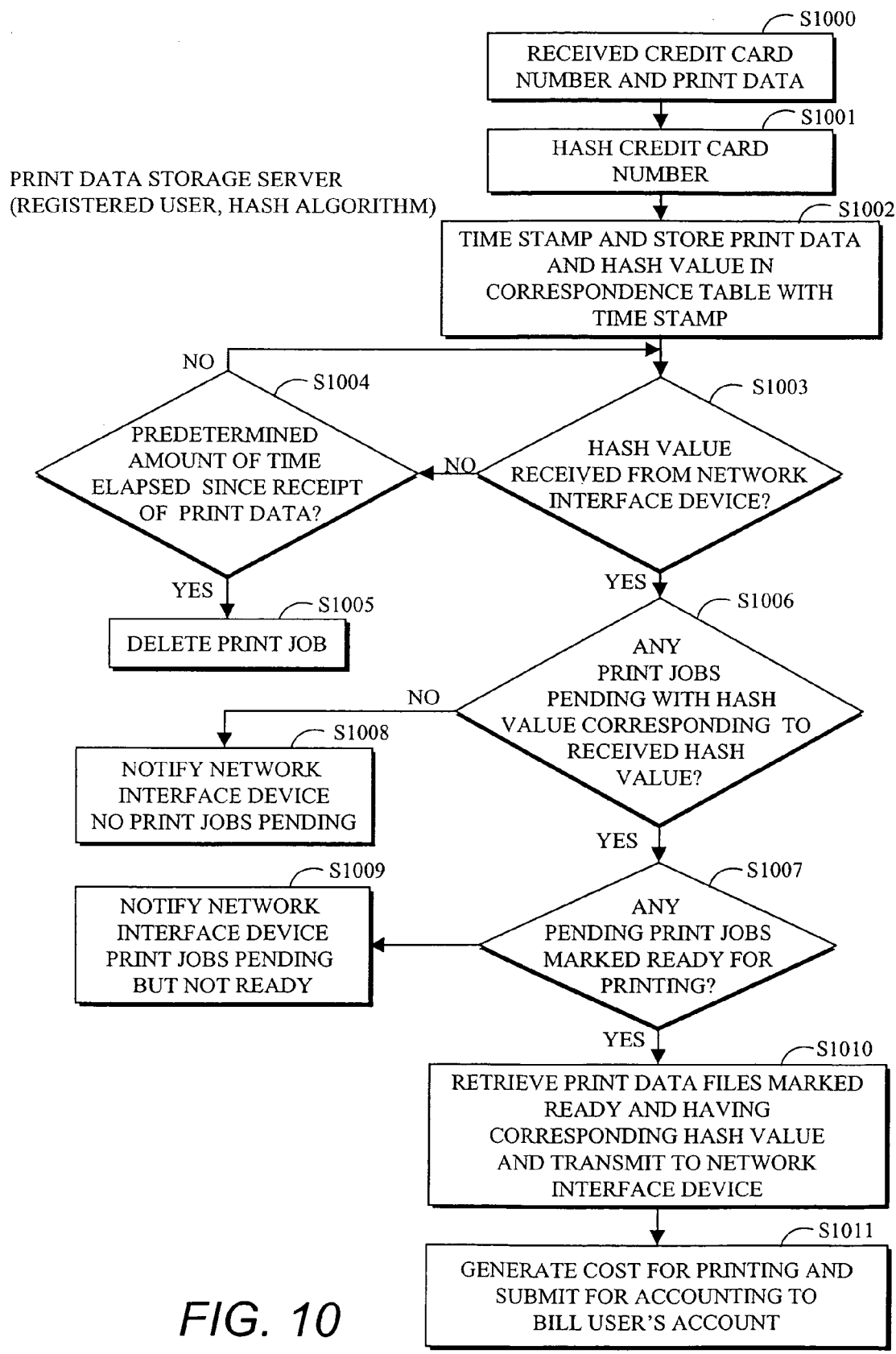
FIG. 10 is a flowchart of process steps performed by an Internet printing server where the user uploads files utilizing a registered user account and a secure hash algorithm is employed for securely transmitting the credit card information.

The foregoing provided a description of a user uploading data files to an Internet printing service provider's server (e.g. server 18). As described above, the user can either upload files utilizing a Quick Print option or a Registered User option. The credit card information can be securely uploaded utilizing a secure protocol such as SSL and optionally, upon receipt by the server, can be subjected to a secure hash algorithm with the hash value or ciphered text then being stored in the server. A description will now be made with reference to FIGS. 7 to 10 of server 18's functionality in receiving the uploaded print data and credit card information, storing the data and credit card information in a correspondence table, and subsequently transmitting the uploaded data files to a printer for printing upon receipt of credit card information from the printer (or a network interface device connected to the printer). FIG. 7 is a flowchart of process steps where the user uploads data files utilizing Quick Print and SSL is employed as the secure transmission protocol. FIG. 8 is a flowchart of process steps where the user uploads data files utilizing the Registered Users option and SSL is employed. FIG. 9 is a flowchart of process steps where the user uploads files via SSL utilizing Quick Print and a secure hash algorithm is employed in the server. FIG. 10 is a flowchart of process steps where the user uploads files via SSL utilizing a Registered Users option and a secure hash algorithm is employed in the server.

As seen in FIG. 7, when the user selects the Quick Print option and a data file and credit card information are uploaded to server 18, the server receives the data files and the credit card information via SSL (step S701). Server 18 stores the received data file(s) and the credit card information in a correspondence table (step S702). That is, server 18 stores the data file(s) either locally (i.e. on a hard disk or storage device within server 18) or remotely (i.e. on a hard disk or storage device connected to network 1 or a local network (not shown) or to server 18). Server 18 also stores the uploaded credit card information in a correspondence table that matches the credit card information with the uploaded data file(s).

When the user uploads data files for printing, the uploaded data is time stamped (step S702). The time stamp information may be stored in the correspondence table together with the credit card information and the data files. The time stamp may be utilized for purging data files that become stale, i.e. that are not printed within a predetermined timeframe, or for some other accounting purpose. After a user uploads a data file utilizing the Quick Print option, server 18 waits to receive credit card information and determines whether credit card information is received from a network interface device (step S703). If not, server 18 determines whether a predetermined amount of time (such as 24 hours) has elapsed since the data was uploaded (step S704). This may comprise a background program that purges data files on a daily basis based on how long the files have been stored in the server. If the predetermined time has elapsed, the data file may be deleted and the credit card information corresponding to the deleted data file is also deleted from server 18 (step S705). If the predetermined time has not elapsed, flow returns to step S703 to again determine whether server 18 has received credit card information from a network interface device.

Upon receiving credit card information from a network interface device (the process of the network interface device transmitting the credit card information to server 18 will be described below), server 18 queries the correspondence table to determine if credit card information corresponding to the credit card information received from the network interface device is present, indicating whether or not a print job is pending for the received credit card information (step S706). If credit card information corresponding to the received credit card information is not present in the correspondence table, then server 18 sends a notification message to the network interface device that no print jobs are pending (step S708). If credit card information corresponding to the received credit card information is present in the correspondence table, then server 18 retrieves the stored data file(s) corresponding to the received credit card information and transmits the data file(s) to the network interface device via SSL (step S707).

Finally, in step S708, cost data is generated and submitted for accounting purposes. The cost data may be generated on a per page basis and may also include a cost for various printing options. The cost data may be submitted to an accounting server (not shown) or to an accounting program within server 18. The accounting server or the accounting program may bill the Quick Print user's credit card for the cost of utilizing the Internet printing service.

FIG. 8 is a flowchart of process steps performed by server 18 when the user uploads data files via SSL utilizing the Registered Users option. In FIG. 8, steps S801 to S805 are the same as steps S701 to S705 described above with regard to FIG. 7. However, one difference in these steps may be the amount of predetermined time utilized in step S804. In this regard, FIG. 7 described a case where a user uploads data files utilizing the Quick Print option. With the Quick Print option, the predetermined time before an uploaded data file and its associated credit card information is deleted is preferably short, e.g. 24 hours. By providing a short time period before a print job is deleted, the user is encouraged to actually perform a timely print operation, i.e. to upload and print their print job within a short time period. Additionally, the amount of data stored on server 18 or any other storage device in which the data files are stored can be reduced by deleting unprinted files.

A shorter timeframe for deletion of the data files may also encourage users to register as a registered user of the Internet printing service. In this regard, the Internet printing service provider may provide registered users with additional services or discounts. For example, the Internet Printing Service Provider may give registered users a discounted rate for utilizing the Internet printing service. Additionally, the Internet printing service provider may allow registered users to utilize the Internet printing service as a network data storage mechanism. That is, registered users can upload data files to server 18 and store the data files on server 18, or another storage device connected to server 18, either locally or remotely via a network. In this manner, registered users can utilize the Internet printing service as a backup storage device. However, like the data files uploaded by Quick Print, data files uploaded by a registered user are also preferably deleted after a predetermined timeframe, albeit a somewhat longer timeframe. For instance, uploaded data files for registered users may be deleted after thirty days, sixty days, ninety days, etc. Prior to deletion however, the registered user may be informed via an email message that the uploaded file will be deleted. Thus, while step S804 provides for deletion of uploaded data files after a predetermined amount of time, the timeframe for deletion is preferably somewhat longer than that utilized for data files uploaded via Quick Print.

Returning to FIG. 8, steps S806 and S808 are similar to steps S706 and S708 and therefore, the description of those steps apply equally to steps S806 and S808. Accordingly, when server 18 receives credit card information from a network interface device in step S803 and determines that print jobs with credit card information corresponding to the received credit card information are pending (step S806), server 18 next determines whether any of the pending print jobs are marked READY for printing (step S807). As described above with regard to FIG. 21, a registered user may be required to mark which print jobs are to be printed by checking Print box 517. Accordingly, only those print jobs that have been marked as READY for printing by the user checking box 517 would be printed. As such, if the registered user has not marked any of his/her uploaded print jobs as READY, the network interface device is notified of such (step S809) and the user may be notified of the same by, for example, the printer displaying an error message. Of course, marking a print job as READY for printing is merely one embodiment of the invention and in a different embodiment, steps S807 and S809 could be omitted. In such an alternative embodiment, when server 18 receives credit card information from a network interface device and determines that print jobs are present with corresponding credit card information, each such print job could be transmitted regardless of whether or not it is marked as READY.

Steps S810 and S811 are similar to steps S707 and S708. As such, print jobs that have been marked as READY are transmitted to the network interface device via SSL (step S810) and cost data is generated and submitted for accounting purposes (step S811). One difference between step S708 and S811 may be that the registered user may receive a discount billing rate. Additionally, rather than billing the user's credit card as in step S708, the cost of the transaction may be applied to the registered user's account.

FIG. 9 is a flowchart of process steps performed by server 18 in an embodiment for Quick Print where a secure hash algorithm is utilized in server 18 for storing the credit card number. The process steps depicted in FIG. 9 are somewhat similar to those depicted in FIG. 7. However, in step S901 a hash algorithm is performed on the received credit card information and the resultant hash value is stored in the correspondence table in step S902. In step S903, instead of receiving credit card information from the network interface device, the network interface device hashes the credit card number and the hash value is received. Based on the received hash valued, a determination is made whether a print job is pending in server 18, and if so, the print data is retrieved and transmitted to the network interface device in step S907. Thus, while the process steps are somewhat similar to those utilized in FIG. 7, additional security may be provided for due to hashing of the credit card number and storing the hash value rather than storing the credit card number, as well as transmitting the hash value by the network interface device instead of transmitting the credit card number.

FIG. 10 is a flowchart of process steps performed by server 18 in an embodiment where credit card information is uploaded via SSL utilizing a registered users option and a secure hash algorithm is utilized in storing the credit card number in server 18. The process steps depicted in FIG. 10 are similar to those depicted in FIG. 8. However, steps S1001, S1002, S1003 and S1006 in FIG. 10 are the same as steps S901, S902, S903 and S906, respectively, of FIG. 9.

Figure 11:
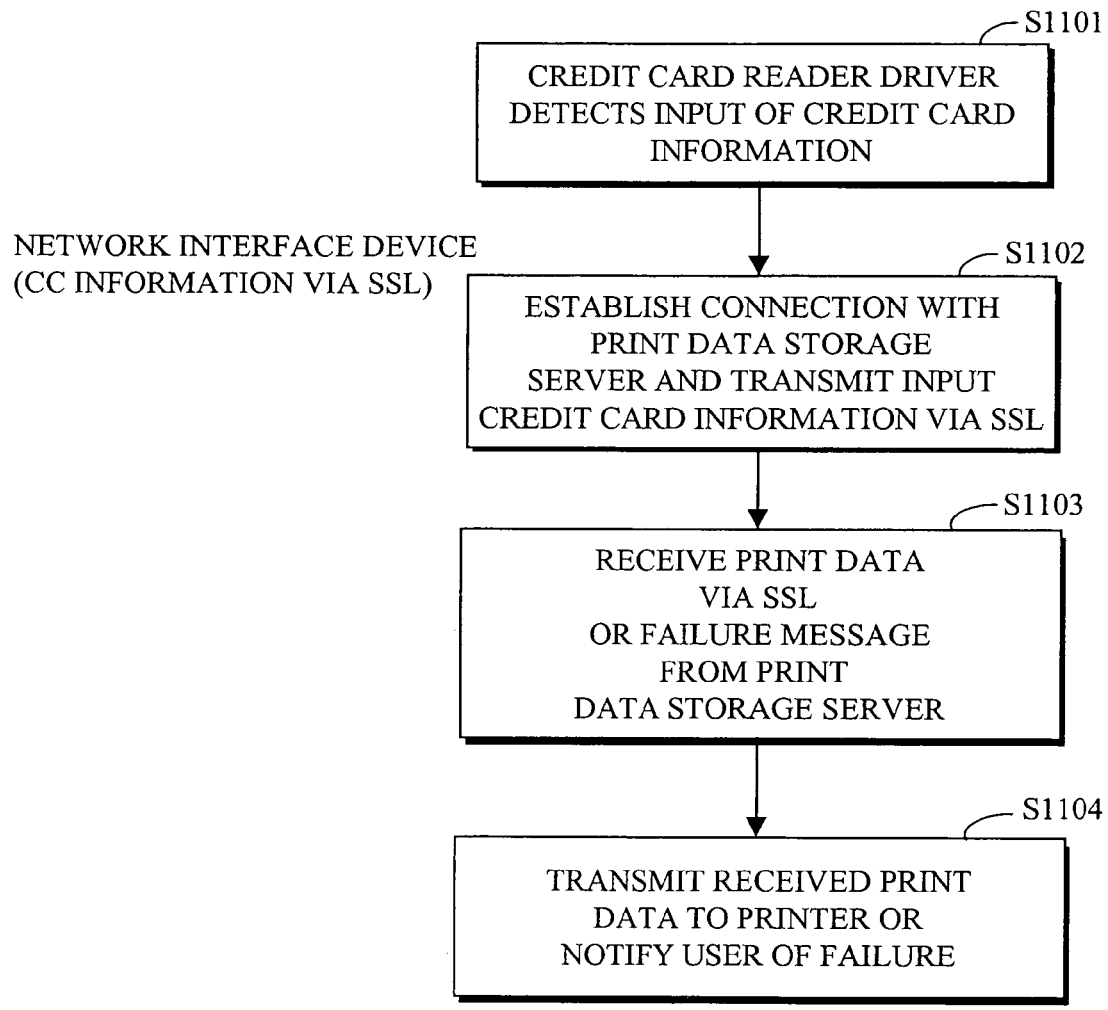
FIG. 11 is a flowchart depicting process steps performed by a network interface device where credit card information is transmitted via SSL.

FIG. 11 is a flowchart depicting process steps performed by network interface device 25. As seen in FIG. 11, in step S1101, credit card reader driver 484 connected to credit card reader interface 466 (FIG. 4) detects the input of credit card information from, for example, credit card reader 23. The credit card information may be input to credit card reader 23 by a user swiping his/her credit card through the reader. Alternatively, the credit card information can be input by the user utilizing a keypad on the printer, or utilizing a portable device (PDA) via infrared or RF, or other means. Network interface device 25 then establishes a connection with network print service provider server 18 via network interface 460 and transmits the input credit card information to server 18 via SSL. As described above with regard to FIGS. 7 and 8, server 18 receives the credit card information from network interface device 25 (steps S703 and S803) and transmits print data (steps S707 and S810) to network interface device 25 via SSL. The print data transmitted by server 18 is received by network interface device 25 in step S1103. Alternatively, if no print jobs are pending in server 18 that have credit card information corresponding to the credit card information input at network interface device 25, then server 18 transmits a failure message to network interface device 25 whereby the failure message is received in step S1103.

Upon receiving the print data from server 18, network interface device 25 transmits the print data to printer 21, either via a direct connection between printer interface 465 and printer 21, or via network interface 460 and network 1. In a case where the network interface device is embedded in the printer, such as that described above with regard to copier/printer 22, the print data is merely transmitted from the network interface device to a print engine within copier/printer 22. It should be noted that, in order for the printer to print the received print data, the print data is rendered into a printer definition language corresponding to the type of printer that the print data is being transmitted to. In this regard, the print data may be rendered by a print driver application in computer 10 prior to uploading to server 18, by server 18 prior to transmission to network interface device 25, by network interface device 25 after being received from server 18 (depicted in FIG. 13), or by printer 21 after receiving the data from network interface device 25. Step S1305 of FIG. 13 depicts a case where the print data is rendered into a printer definition language by a print driver in network interface device 25 when the device receives the print data from server 18 and prior to the device transmitting the print data to the printer in step S1304.

Figure 12:
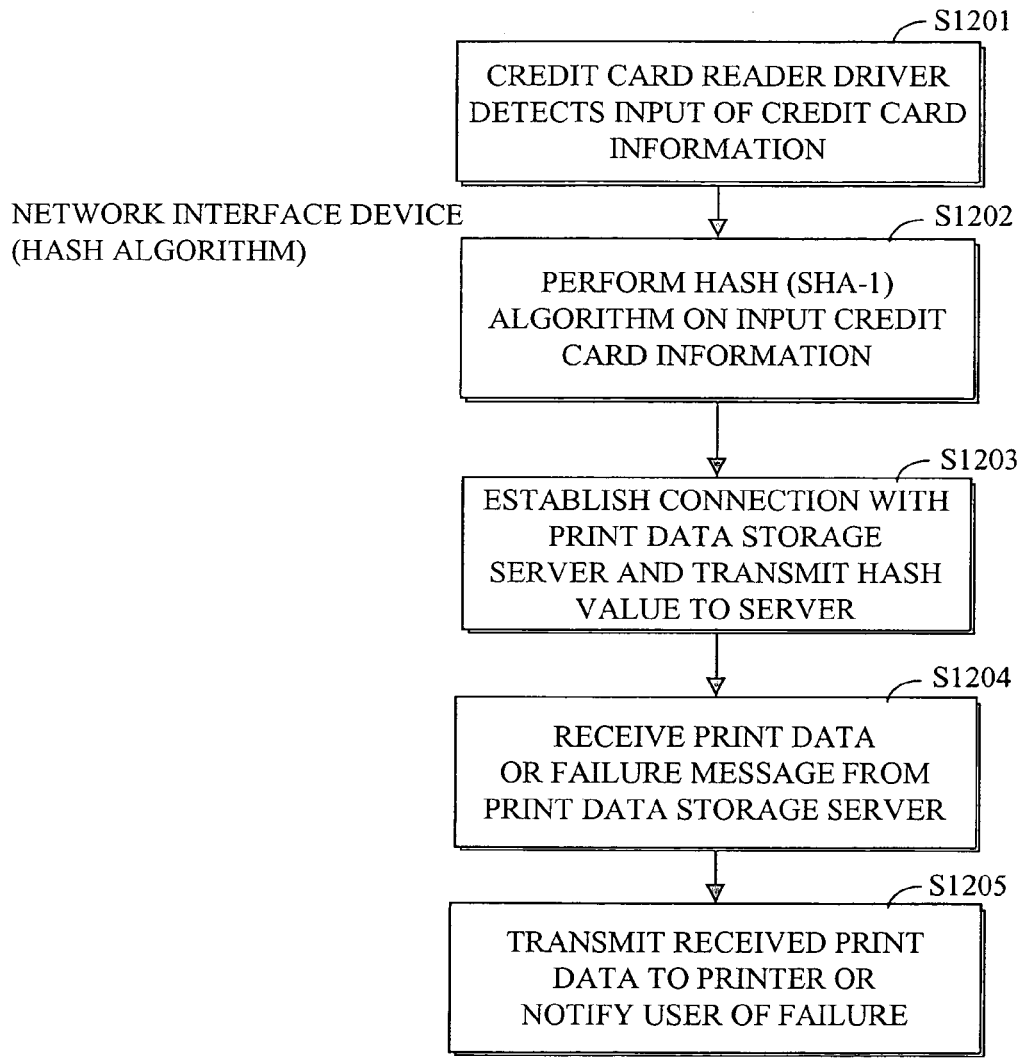
FIG. 12 is a flowchart depicting process steps performed by a network interface device where a secure hash algorithm is employed.

FIG. 12 is a flowchart of process steps performed by network interface device 25 in a case where a hashing algorithm is utilized rather than transmitting the credit card information to server 18 via SSL. Step S1201 of FIG. 12 is similar to step S1101 in that credit card reader driver 484 detects the input of credit card information when the user swipes his credit card through credit card reader 23. In step S1202, encryption/decryption logic 482, which preferably comprises a SHA-1 secure hashing algorithm, hashes the credit card information to obtain a hash value. The hash value is then transmitted by network interface device 25 to server 18 in step S1203.

Upon receiving the hash value (steps S903 and S1003 of FIGS. 9 and 10), server 18 transmits print data having a corresponding hash value to network interface device 25 (steps S907 and S1010). Similar to FIG. 11, when network interface device receives the print data from server 18 (step S1204), the print data is transmitted to printer 21 (step S1205). Alternatively, if the network interface device receives a failure message from the server, it may display an appropriate message indicating the failure. Again, the print data may be transmitted directly to printer 21 via printer interface 465 or via network interface 460 and network 1, and the print data may be rendered into a printer definition language prior to being transmitted to printer 21.

Figure 13:
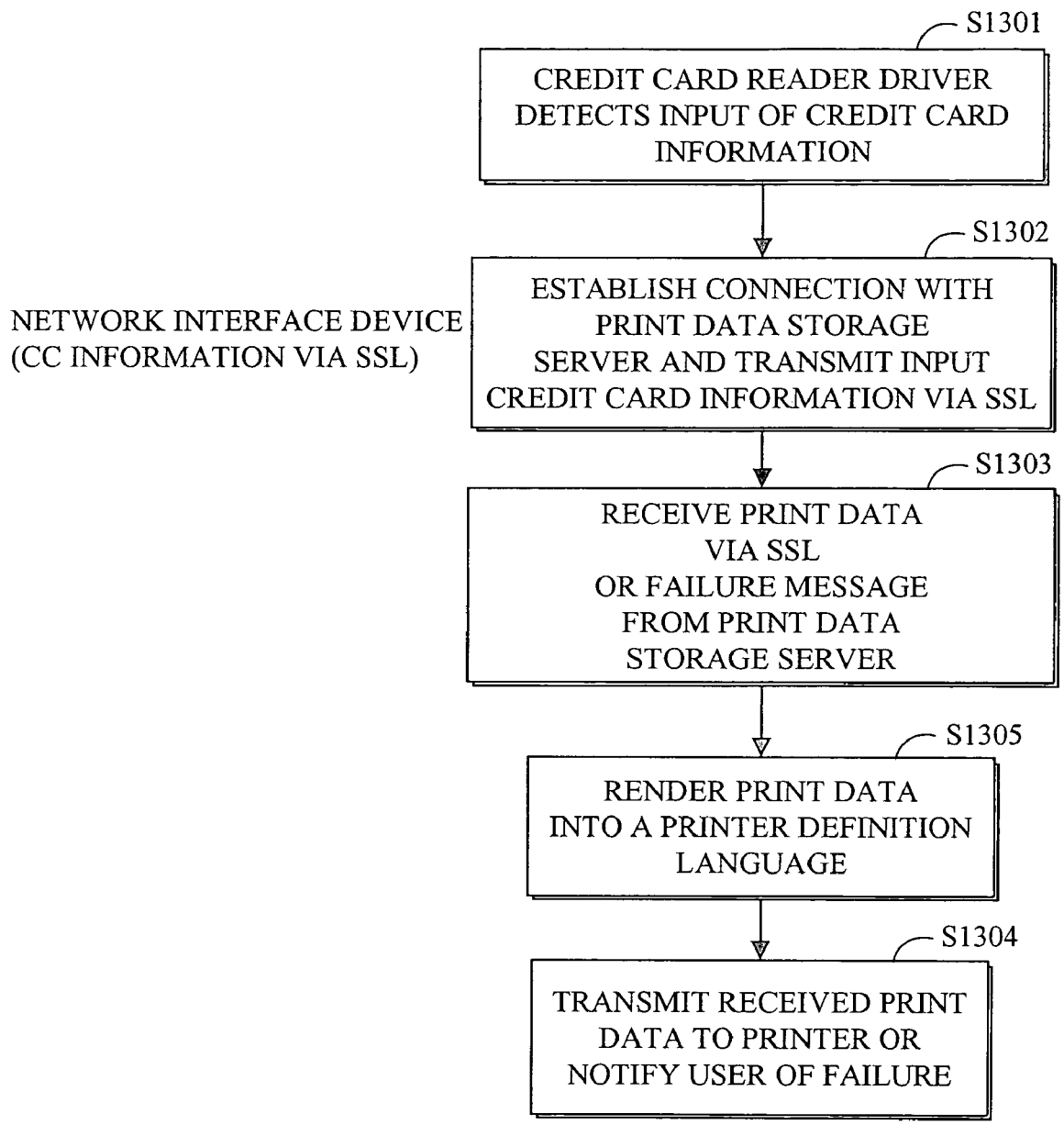
FIG. 13 is a flowchart of process steps performed by a network interface device where credit card information is transmitted via SSL and the device itself renders the print data into a printer definition language.
Figure 31:
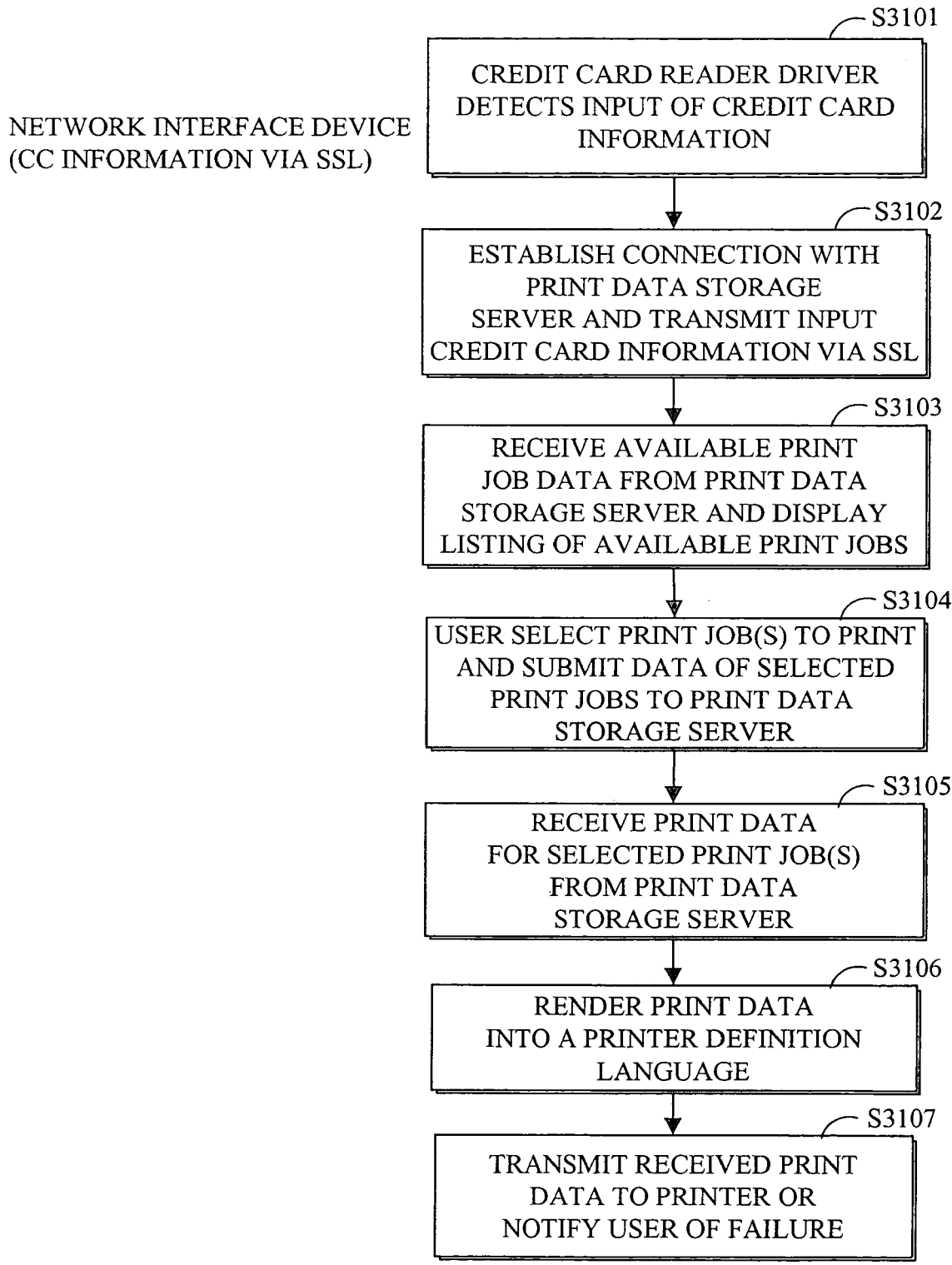
FIG. 31 is a flowchart of process steps performed by a network interface device where a display is provided for a user to select which print jobs are to be printed.

FIG. 31 is an alternative embodiment of that described with regard to FIG. 13. FIG. 31 relates to an embodiment in which the network interface device, or the printer, includes a display panel which can be utilized in practicing the invention. In this regard, the display panel may be any type of display that provides interaction with a user, such as a touch panel display or a display utilized in conjunction with a keypad. In the alternative embodiment, after the network interface device transmits the credit card information, or alternatively the hash value, to server 18, a listing of available print jobs may be displayed on the display such that a user can select which print jobs should be printed.

In more detail, in step S3101, the credit card reader detects the input of credit card information and the input credit card information is transmitted to server 18 (step S3102). Upon receiving the credit card information, server 18 determines whether any print jobs are pending that have the corresponding credit card information, and if so, transmits data listing the pending print jobs, preferably all pending print jobs whether marked ready for printing or not. However, in an alternative arrangement, only data for those print jobs that have been marked ready for printing (where a registered users option is selected) may be transmitted. Network interface device 25 receives the pending (available) print job data and displays a listing of the available print jobs on the display (step S3103). A user can then select one or more print jobs from the display that he wants to have printed and data indicating which print jobs have been selected by the user is submitted back to server 18 (step S3104). Server 18 then retrieves the print data for the selected print jobs and transmits the data to network interface device 25 (step S3105) where the data may then be rendered into a printer definition language (step S3106) and transmitted to a printer (step S3107).

To summarize an Internet printing process utilizing a credit card as identification according to the invention, a user first uploads a print job from a computer workstation, a laptop computer connected to an outlet in a hotel room, or from a mobile device, where the print job consists of print data and credit card information. The uploaded print data and credit card information is stored in a server with a correspondence table linking the credit card information and the uploaded print data. To retrieve the print job, a user merely swipes his/her credit card through a credit card reader connected to a network interface device (preferably connected to a printer, where the printer is part of an Internet printing network of service providers) and the user's print job is printed out at the printer. Accordingly, any user who owns a credit card can utilize the Internet printing network to upload a print job and to have it printed at a printer that is part of the network merely by swiping their credit card at the printer.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of printing over a network, comprising the steps of:
    inputting print data to be printed and associated credit card information at a host terminal;
    uploading a print job comprising the print data and the associated credit card information from the host terminal to a print data storage server;
    inputting credit card information at an input device that communicates with the print data storage server;
    transmitting print data having associated credit card information that corresponds to the credit card information input at the input device from the print data storage server to the input device; and
    printing the print data on a printing device.

2. A method according to claim 1, further comprising, after the uploading step and prior to inputting the credit card information at the input device, marking the uploaded print job as ready for printing.

3. A method according to claim 2, wherein the print data transmitted from the print data storage server to the input device is print data corresponding to the print job that has been marked as ready for printing.

4. A method according to claim 2, wherein after a predetermined period of time, the marked print job is automatically unmarked.

5. A method according to claim 4, wherein the automatically unmarked print job is deleted from the print data storage server.

6. A method according to claim 4, wherein the automatically unmarked print job remains stored in the print data storage server as an unmarked print job.

7. A method according to claim 1, wherein the credit card information is input at the input device by a credit card reader.

8. A method according to claim 1, further comprising charging an account associated with the credit card information input at the input device for a cost related to printing of the print data.

9. A method according to claim 1, further comprising storing the uploaded print data and credit card information in the print data storage server.

10. A method according to claim 9, wherein the uploaded print data and the credit card information are stored utilizing a cross-reference table.

11. A method according to claim 1, wherein the credit card information is input at the input device utilizing a keypad.

12. A method according to claim 1, wherein the credit card information is input at the input device via a wireless transmission from a portable device.

13. A system for printing over a network, comprising a host terminal, a print data storage server, a network interface device, and a printing device,
the host terminal, comprising:
an input device that inputs print data to be printed and associated credit card information; and
a transmitter that transmits the input print data and the associated credit card information to the print data storage server;
the print data storage server, comprising:
a receiver that receives the print data and the associated credit card information transmitted by the host terminal, and that receives credit card information from the network interface device; and
a transmitter that transmits to the network interface device, print data having associated credit card information corresponding to the credit card information received by the receiver from the network interface device;
the network interface device, comprising:
a first receiver that receives input credit card information;
a first transmitter that transmits the input credit card information to the print data storage server;
a second receiver that receives the print data from the print data storage server; and
a second transmitter that transmits the received print data to the printing device; and
the printing device, comprising:
a receiver that receives the print data transmitted by the network interface device; and
an image outputting device that outputs an image based on the received print data.

14. A printing device, comprising:
a receiver that receives print data transmitted over a network;
an image output device that outputs an image based on the print data received by the receiver;
an input device that inputs credit card information; and
a transmitter that transmits the input credit card information over the network to a print data storage server,
wherein, the print data storage server stores print data and associated credit card information that is uploaded to the print data storage server, and
wherein, when the input credit card information is transmitted to the print data storage server by the transmitter, the print data storage server transmits print data which has associated credit card information that corresponds to the input credit card information to the receiver.

15. A printing device according to claim 14, wherein the input device comprises a credit card reader.

16. A printing device according to claim 14, wherein the input device is a keypad.

17. A printing device according to claim 14, wherein the input device is a receiver that receives a wireless transmission from a portable device.

18. A printing device, comprising:
an image output device that outputs an image based on print data received by the printing device;
a memory that stores executable process steps; and
a processor that executes the executable process steps, the executable process steps comprising (a) receiving input credit card information, (b) transmitting the input credit card information to a print data storage server, (c) receiving print data from the print data storage server, wherein the received print data is print data which is uploaded to the print data storage server with associated credit card information and, wherein the received print data has associated credit card information that corresponds to the input credit card information, and (d) outputting an image based on the received print data.

19. A server apparatus, comprising:
a first receiver that receives print data and associated credit card information from a host terminal;
a storage medium that stores the print data and the associated credit card information;
a second receiver that receives credit card information from a credit card input device;
a processor that determines whether the received credit card information received by the second receiver corresponds to the associated credit card information stored in the storage medium; and
a transmitter that transmits print data stored in the storage medium that has associated credit card information corresponding to the credit card information received by the second receiver to the credit card input device.

20. A server apparatus, comprising:
a memory that stores executable process steps; and
a processor that executes the executable process steps, wherein the executable process steps comprise (a) a first receiving step of receiving print data and associated credit card information from a host terminal, (b) storing the received print data and the associated credit card information, (c) a second receiving step of receiving credit card information from a credit card input device, (d) a determining step of determining whether the credit card information received in the second receiving step corresponds to the associated credit card information stored in the storing step, and (e) transmitting stored print data that has associated credit card information corresponding to the credit card information received in the second to receiving step to the credit card input device.

21. Computer-executable process steps stored on a computer-readable medium that, when executed by a computer, causes the computer to perform a method for printing over a network, comprising the steps of:
a first input step of inputting print data to be printed and associated credit card information;
uploading a print job comprising the print data and the associated credit card information input in the first input to a print data storage server;
a second input step of inputting credit card information at an input device that communicates with the print data storage server;
transmitting print data having associated credit card information that corresponds to the credit card information input in the second input step from the print data storage server to the input device; and
printing the print data on a printing device.

22. Computer-executable process steps according to claim 21, further comprising, after the uploading step and prior to the second input step, marking the uploaded print job as ready for printing.

23. Computer-executable process steps according to claim 22, wherein the print data transmitted from the print data storage server to the input device is print data corresponding to the print job that has been marked as ready for printing.

24. Computer-executable process steps according to claim 22, wherein after a predetermined period of time, the marked print job is automatically unmarked.

25. Computer-executable process steps according to claim 24, wherein the automatically unmarked print job is deleted from the print data storage server.

26. Computer-executable process steps according to claim 24, wherein the automatically unmarked print job remains stored in the print data storage server as an unmarked print job.

27. Computer-executable process steps according to claim 21, wherein the credit card information is input at the input device by a credit card reader.

28. Computer-executable process steps according to claim 21, further comprising charging an account associated with the credit card information input at the input device for a cost related to printing of the print data.

29. Computer-executable process steps according to claim 21, further comprising storing the uploaded print data and credit card information in the print data storage server.

30. Computer-executable process steps according to claim 29, wherein the uploaded print data and the credit card information are stored utilizing a cross-reference table.

31. Computer-executable process steps according to claim 21, wherein the credit card information is input at the input device utilizing a keypad.

32. Computer-executable process steps according to claim 21, wherein the credit card information is input at the input device via a wireless transmission from a portable device.

33. A computer-readable medium which stores computer-executable process steps for printing over a network, the computer-executable process steps comprising:
a first input step of inputting print data to be printed and associated credit card information;
uploading a print job comprising the print data and the associated credit card information input in the first input to a print data storage server;
a second input step of inputting credit card information at an input device that communicates with the print data storage server;
transmitting print data having associated credit card information that corresponds to the credit card information input in the second input step from the print data storage server to the input device; and
printing the print data on a printing device.

34. A computer-readable medium according to claim 33, further comprising, after the uploading step and prior to the second input step, marking the uploaded print job as ready for printing.

35. A computer-readable medium according to claim 34, wherein the print data transmitted from the print data storage server to the input device is print data corresponding to the print job that has been marked as ready for printing.

36. A computer-readable medium according to claim 34, wherein after a predetermined period of time, the marked print job is automatically unmarked.

37. A computer-readable medium according to claim 36, wherein the automatically unmarked print job is deleted from the print data storage server.

38. A computer-readable medium according to claim 36, wherein the automatically unmarked print job remains stored in the print data storage server as an unmarked print job.

39. A computer-readable medium according to claim 33, wherein the credit card information is input at the input device by a credit card reader.

40. A computer-readable medium according to claim 33, further comprising charging an account associated with the credit card information input at the input device for a cost related to printing of the print data.

41. A computer-readable medium according to claim 33, further comprising storing the uploaded print data and credit card information in the print data storage server.

42. A computer-readable medium according to claim 41, wherein the uploaded print data and the credit card information are stored utilizing a cross-reference table.

43. A computer-readable medium according to claim 33, wherein the credit card information is input at the input device utilizing a keypad.

44. A computer-readable medium according to claim 33, wherein the credit card information is input at the input device via a wireless transmission from a portable device.

45. A method of printing over a network, comprising the steps of:
inputting print data to be printed and associated credit card information at a host terminal;
uploading a print job comprising the print data and the associated credit card information from the host terminal to a print data storage server;
a first encrypting step of the print data storage server performing an encryption process on the associated credit card information and storing a first resultant value with the print data;
inputting credit card information at an input device that communicates with the print data storage server;
a second encrypting step of the input device performing an encryption process on the input credit card information to obtain a second resultant value;
a first transmitting step of the input device transmitting the second resultant value to the print data storage server;
a second transmitting step of the print data storage server transmitting print data having a first resultant value that corresponds to the second resultant value to the input device; and
printing the print data on a printing device.

46. A method according to claim 45, wherein the first encrypting step and the second encrypting step comprise a same encryption process.

47. A method according to claim 46, wherein the encryption process comprises a secure hashing algorithm.

48. A method of printing over a network, comprising the steps of:
inputting print data to be printed and associated credit card information at a host terminal;
uploading a print job comprising the print data and the associated credit card information from the host terminal to a print data storage server;
inputting credit card information at an input device that communicates with the print data storage server;
a first transmitting step of transmitting the credit card information input in the inputting step to the print data storage server;
a second transmitting step of the print data storage server transmitting data indicative of at least one pending print job that corresponds to the credit card information transmitted in the first transmitting step;

displaying a listing of pending print jobs based on the data transmitted in the second transmitting step;
selecting at least one print job from the listing displayed in the displaying step;
a third transmitting step of transmitting data indicative of the at least one print job selected in the selecting step;

a fourth transmitting step of transmitting print data corresponding to the at least one selected print job to the input device; and
printing the print data on a printing device.

* * * * *

UNITED STATES PATENT AND TRADEMARK OFFICE
CERTIFICATE OF CORRECTION

PATENT NO. : 7,113,299 B2 Page 1 of 1
APPLICATION NO. : 09/903940
DATED : September 26, 2006
INVENTOR(S) : Stephanie Ann Suzuki et al.

It is certified that error appears in the above-identified patent and that said Letters Patent is hereby corrected as shown below:

COLUMN 2:
Line 42, "flexability" should read -- flexibility --.

COLUMN 7:
Line 66, "include" should read -- includes --.

COLUMN 10:
Line 43, "contains" should read -- contain --.

COLUMN 11:
Line 42, "contains" should read -- contain --.

COLUMN 12:
Line 19, "such" should read -- such as --; and
Line 47, "device" should read -- device 25 --.

COLUMN 18:
Line 9, "valued," should read -- value, --.

COLUMN 22:
Line 44, "second to receiving step" should read -- second receiving step --.

Signed and Sealed this

Seventeenth Day of July, 2007

JON W. DUDAS
*Director of the United States Patent and Trademark Office*